United States Patent
Eberhardt et al.

(10) Patent No.: US 10,089,434 B2
(45) Date of Patent: Oct. 2, 2018

(54) METHOD AND SYSTEM FOR FORMING SITE NETWORK

(71) Applicant: Beckman Coulter, Inc., Brea, CA (US)

(72) Inventors: Michael Eberhardt, Munich (DE); Charles Martinez, Yorba Linda, CA (US); Thomas T. Nguyen, Hacienda Heights, CA (US); Guenther Schulmayr, Munich (DE)

(73) Assignee: Beckman Coulter, Inc., Brea, CA (US)

( * ) Notice: Subject to any disclaimer, the term of this patent is extended or adjusted under 35 U.S.C. 154(b) by 579 days.

(21) Appl. No.: 14/705,329

(22) Filed: May 6, 2015

(65) Prior Publication Data

US 2015/0324502 A1 Nov. 12, 2015

Related U.S. Application Data

(60) Provisional application No. 61/989,054, filed on May 6, 2014.

(51) Int. Cl.
*G06G 7/48* (2006.01)
*G06F 17/50* (2006.01)

(52) U.S. Cl.
CPC ........ *G06F 17/509* (2013.01); *G06F 17/5004* (2013.01); *G06F 17/5009* (2013.01)

(58) Field of Classification Search
CPC .................................................. G06F 17/509
USPC .............................................................. 703/6
See application file for complete search history.

(56) References Cited

U.S. PATENT DOCUMENTS

| | | | |
|---|---|---|---|
| 5,737,498 A | 4/1998 | Murray | |
| 6,546,364 B1 | 4/2003 | Smirnov et al. | |
| 6,581,012 B1 | 6/2003 | Aryev et al. | |
| 6,721,615 B2 | 4/2004 | Fava et al. | |
| 7,937,655 B2 | 5/2011 | Teng et al. | |
| 2002/0138543 A1 | 9/2002 | Teng et al. | |
| 2002/0147515 A1 | 10/2002 | Fava et al. | |
| 2004/0098151 A1 | 5/2004 | Carlucci et al. | |
| 2004/0103073 A1 | 5/2004 | Blake et al. | |
| 2006/0148063 A1 | 7/2006 | Fauzzi et al. | |
| 2007/0143074 A1 | 6/2007 | Gakkestey et al. | |
| 2008/0113440 A1 | 5/2008 | Gurney et al. | |
| 2008/0235055 A1 | 9/2008 | Mattingly et al. | |
| 2012/0109531 A1 | 5/2012 | Knafel et al. | |
| 2012/0129673 A1 | 5/2012 | Fukugaki et al. | |
| 2012/0159494 A1 | 6/2012 | Shafiee et al. | |
| 2013/0022499 A1 | 1/2013 | Mizumoto et al. | |

(Continued)

FOREIGN PATENT DOCUMENTS

| | | |
|---|---|---|
| EP | 2 450 711 A1 | 5/2012 |
| WO | 90/03618 A1 | 4/1990 |

(Continued)

OTHER PUBLICATIONS

Extended European Search Report dated Nov. 9, 2015 for EP Patent Application No. 13795104.2, 9 pages.

(Continued)

*Primary Examiner* — Hugh Jones

(74) *Attorney, Agent, or Firm* — Kilpatrick Townsend & Stockton LLP

(57) ABSTRACT

A method for creating a laboratory automation system is disclosed. The method includes obtaining a plurality of subgraphs that correspond to a plurality of system blocks. The system blocks are chosen and the subgraphs are stitched together to form a site graph for the laboratory automation system.

22 Claims, 21 Drawing Sheets

(56) References Cited

U.S. PATENT DOCUMENTS

2013/0125675 A1    5/2013  Mueller et al.
2014/0129172 A1    5/2014  Eberhardt et al.
2014/0305227 A1    10/2014 Johns

FOREIGN PATENT DOCUMENTS

WO        98/12654 A2     3/1998
WO     2012/012779 A2     1/2012
WO     2012/090795 A1     7/2012
WO     2013/070756 A2     5/2013

OTHER PUBLICATIONS

Non-Final Office Action dated Mar. 2, 2016 for U.S. Appl. No. 14/074,069, 15 pages.
International Search Report and Written Opinion dated May 13, 2014 for PCT Patent Application No. PCT/US2013/068886, 17 pages.
International Search Report and Written Opinion dated Jul. 15, 2015 for PCT Patent Application No. PCT/US2015/029425, 12 pages.
Drira, et al., "Facility layout problems: A survey," Annual Reviews in Control, Nov. 5, 2007, vol. 31, No. 2, pp. 255-267.
Guirardello, R., et al., "Optimization of Process Plant Layout with Pipe Routing," Computers and Chemical Engineering, Nov. 15, 2015, vol. 30, No. 1, pp. 99-114.
ProModel Project Review, Apr. 8, 2006, www.promodel.com, 2 pages.
Non-Final Office Action dated Dec. 14, 2016 for U.S. Appl. No. 14/074,069, 12 pages.
Non-Final Office Action dated Jul. 12, 2016 for U.S. Appl. No. 14/074,069, 10 pages.

SUB-GRAPH FOR
TRACK END SYSTEM BLOCK

METHOD AND SYSTEM FOR FORMING SITE NETWORK

CROSS-REFERENCES TO RELATED APPLICATIONS

This application is a non-provisional of and claims the benefit of the filing date of U.S. Provisional Patent Application No. 61/989,054, filed on May 6, 2014, which is herein incorporated by reference in its entirety for all purposes.

BACKGROUND

Laboratory automation systems are used to process samples in sample containers such as sample tubes. Such automation systems can utilize instruments such as centrifuges, aliquoters, decappers, and recappers.

For various reasons, the users of laboratory automation systems may need to have their systems specifically designed to fit predetermined space and processing constraints. Designing such user-specific laboratory automation systems is long and cumbersome. Further, even after a specific laboratory automation system configuration is created, the laboratory automation system may not operate as expected by the user. For example, after installation of a specific laboratory automation system, the user may determine that there are processing delays, because there are an insufficient number of aliquoters or decappers. Alternatively, the user may have determined that the system could have been arranged in a manner that could have resulted in increased processing speed.

A number of processing systems are described in the prior art.

U.S. Pat. No. 5,737,498 discloses a method for generating a schedule for the performance of a process. The method generates a node list wherein each node corresponds to at least one step in the process, and a list of tasks (work instructions) for each step of the process. Based on the node and task list, the scheduler generates a sequence of the steps (see FIG. 3 of U.S. Pat. No. 5,737,498 A).

U.S. Pat. No. 6,546,364 discloses a scheduler engine that is configured to generate a workflow ("route schedule") including a sequence of tasks ("work instructions") in a dynamically changing physical environment.

The scheduler engine generates a virtual representation of a physical environment, including a bill or materials, represented by state nodes, and a bill of resources, represented by task nodes and monitors the execution of the generated workflow. Further, the physical environment is constantly monitored for changes to update the virtual representation in case of a status change.

U.S. Pat. No. 6,721,615 discloses a method for the management of a workcell system that monitors the status (availability) of a resource and the processing status of a sample in the process and dynamically updates the sample protocol in case of an unexpected event (see FIG. 1 and 1A of U.S. Pat. No. 6,721,615 B2).

None of these references addresses the problems associated with the lengthy and cumbersome, and sometimes inaccurate conventional processes for designing laboratory automation systems. Embodiments of the invention address these and other problems, individually and collectively.

BRIEF SUMMARY

Embodiments of the invention are directed to systems and methods for creating site graphs for laboratory automation systems.

One embodiment of the invention is directed to a method comprising receiving, by a processor, laboratory automation system design data for a laboratory automation system. The method also comprises stitching subgraphs associated with the system blocks together to create a site network for the laboratory automation system. Each subgraph comprises site nodes, edges, and pseudo nodes. The subgraph can be associated with at least one subassembly.

Another embodiment of the invention is directed to one or more processors, and a computer readable medium coupled to the one or more processors, the computer readable medium comprising code for causing the one or more processors to implement a method. The method comprises receiving, by the processor, laboratory automation system design data for a laboratory automation system. The method also comprises stitching, by the processor, the subgraphs associated with the system blocks together to create a site network for the laboratory automation system. Each subgraph comprises site nodes, edges, and pseudo nodes. The subgraph can be associated with at least one subassembly.

These and other embodiments of the invention are described in further detail below.

DETAILED DESCRIPTION

Figure 1:
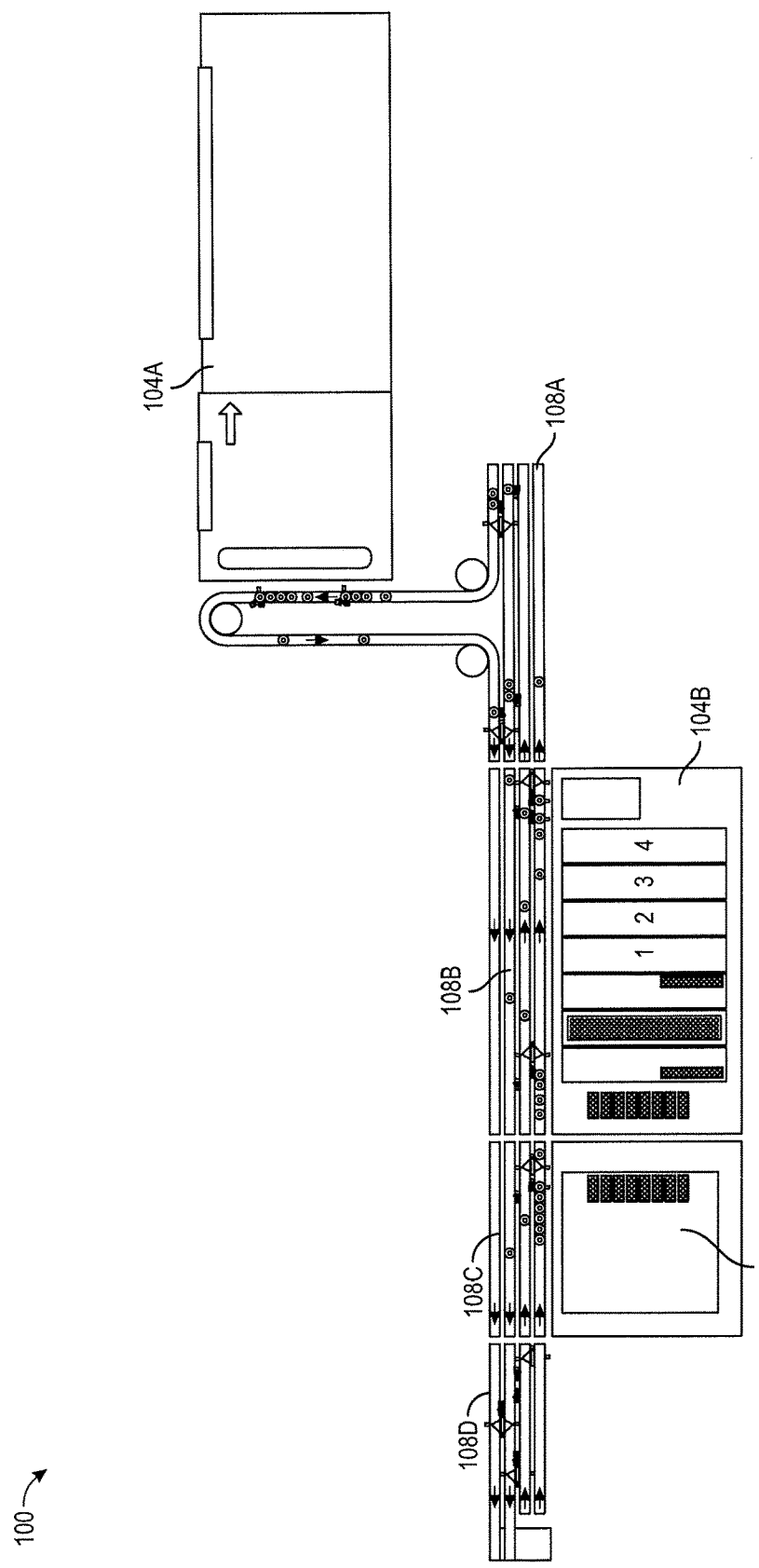
FIG. 1 is a plan view of at least a portion of an interconnected laboratory automation system.

Embodiments of the invention are directed to systems and methods for creating laboratory automation systems. Embodiments of the invention can utilize a catalog of system blocks that can be assembled as desired by a user to create a site graph for a proposed laboratory automation system. The site graph can then be used to simulate the operation of the proposed laboratory automation system. The operation of the proposed laboratory automation design system can be evaluated before the real laboratory automation system is implemented. Embodiments of the invention allow a user to determine if the proposed laboratory automation design system will work according to the desired goals of the user. For example, the user may have predetermined numbers and types of sample tubes to process in a particular area (e.g., a building). Embodiments of the invention can help a user determine the optimal laboratory automation design system given the user's particular design, process, and/or spatial constraints.

Before discussing specific embodiments of the invention, some descriptions of some terms may be useful.

A "system block" may include any suitable component or subset of components in a laboratory automation system. Components may include transfer paths (e.g., tracks) and/or subsystems including recappers, decappers, centrifuges, and aliquoters. In some embodiments, each system block may comprise an identifier (e.g., a part number) that will identify a specific hardware configuration.

A "system block container" may be a software module for a system block. It may include subsystem data and/or track data.

A "site graph" (which may also be referred to as a site network) may represent the functions of the laboratory automation system and can be used to virtually abstract the various hardware configurations of the laboratory automation system. It may include a number of site nodes (e.g., buffer, processing, and transport) and edges connecting the nodes. An edge may be a line between two nodes and the line could be representative of a transfer path for a laboratory product transport element that moves between the two nodes. The site graph may also include one or more pseudo nodes (which may also be referred to as pseudo sites) that represent input into or output from a graph.

A "pseudo node" may include a node that is at a border of a subgraph or site graph. If a pseudo node is at a border of a subgraph, it can be merged with a corresponding pseudo node on another subgraph in a stitching process.

A "subgraph" may be a portion of a site graph. Like a site graph, a subgraph may contain nodes and edges between nodes within the subgraph. A single subgraph may be associated with a single system block. Subgraphs may include a number of site nodes (e.g., buffer, processing, transport, etc.) and edges interconnecting the nodes. A subgraph may include pseudo nodes that can be merged with pseudo nodes of other subgraphs.

"Stitching" may include any suitable method for merging two or more subgraphs. Stitching may involve identifying one or more pseudo nodes in a first subgraph that can be merged with one or more pseudo nodes in a second subgraph. For example, a pseudo node corresponding to a sample output from a first system block may be merged with a pseudo node corresponding to a sample input into a second system block. Once pseudo nodes to be merged are identified, the stitching operation may utilize a graph smoothing operation to merge the pseudo nodes.

In some embodiments, in a graph smoothing operation, a pseudo node $n_1$ in a first subgraph can be mapped to a corresponding pseudo node $n_2$ in a second subgraph.

In some embodiments, for each pair of pseudo nodes ($n_1$, $n_2$), the smoothing operation may replace $n_1$ and $n_2$ with a combined node $n_{12}$ that is adjacent to every node that either $n_1$ or $n_2$ is adjacent to in its associated subgraph. In some cases, three or more pseudo nodes can be combined into a single node. In such cases, the combined node may be adjacent to nodes that any of the merged nodes are adjacent to (i.e., the union of the adjacency lists of the pseudo nodes).

In some embodiments, for each pair of pseudo nodes ($n_1$, $n_2$), the smoothing operation may remove $n_1$ and $n_2$ entirely, such that each node adjacent to $n_1$ in the first subgraph becomes adjacent to each node adjacent to $n_2$ in the second subgraph.

In other embodiments, the graph smoothing operation may utilize any other suitable algorithm for edge contraction or vertex contraction between two or more pseudo nodes.

The result of a stitching operation is a site network that represents the combined operation of multiple system blocks. As described above, each transport or processing node in a subgraph may be associated with a software routine that is used to perform an action associated with the node (e.g., operating a motor to run a centrifuge). The software routine may be implemented in any suitable manner, such as a function, linked library, or shared object. Each edge in the subgraph represents the movement of a sample between transport nodes, and/or between transport nodes and processing nodes. When subgraphs are combined into a site network, the software routines associated with the transport and processing nodes may remain the same, while the edges between the subgraphs enable movement of a sample between system blocks. Thus, the stitching of subgraphs into a site network allows a combined software program for the laboratory automation system to be automatically generated.

In some embodiments, stitching two system blocks together may not alter the functionality of the subsystems that are within those system blocks. For example, two system blocks that can be joined together may include a first system block including a decapper and a first track section, and a second system block includes a centrifuge and a second track section. The functions of the decapper and the centrifuge may be the same, regardless of how the system blocks are arranged with respect to each other.

In other embodiments, stitching two system blocks together may alter the functionality of the subsystems that are within those system blocks. For example, two system blocks that can be joined together may include a first system block including a decapper and a first track section, and a second system block contains a centrifuge and a second track section. The functions of the decapper and the centrifuge may change depending upon how the first and second system blocks are connected to each other and/or whether there are additional system blocks that are connected to them. For example, the decapper in the first system block may be of a particular type from a particular manufacturer and may operate at a predetermined speed. If the first system block is connected to the second system block, the operation of the centrifuge in the second system block may be automatically adjusted (e.g., through firmware) to accommodate for connection to the specific decapper that is present in the first system block.

A "subsystem" may include an instrument or collection of instruments that can perform a specified function. Examples of subsystems include a recapper, decapper, centrifuge, and aliquoter, as well as a sample input and a sample output.

A "subassembly" may be part of a subsystem. Each subsystem may comprise one or more subassemblies. For example, an "output" subsystem may comprise a gripper and a number of drawers. The gripper (or the drawers) may be considered a subassembly in this example.

A "subassembly container" may include a software module that controls a designated grouping of two or more subassemblies. The two or more subassemblies may be parts of different subsystems.

"Laboratory automation system design data" may include any suitable information that is used to create a laboratory automation system. Such data may include information regarding the number and/or types of subsystems and/or subassemblies in the laboratory automation system. Such data may also include information regarding the configuration of different subsystems and/or subassemblies in the laboratory automation system.

In some embodiments, laboratory automation design data may include data relating to selected system blocks and subgraphs to be used in a proposed laboratory automation design system. It may also include the particular arrangement or configuration of those system blocks and/or subgraphs relative to each other, as well as relative to any suitable external parameters such as process constraints (e.g., the number and/or type of assays to be run on the proposed system) or physical constraints (e.g., the size and/or dimensions of the room that will house the laboratory automation system).

The laboratory automation design data may also include data relating to any constraints that may be present in building the system. Examples of such constraints may include process constraints (e.g., the number and/or type of assays to be run on the proposed system, the expected throughput and/or turnaround time, etc.) or physical constraints (e.g., the size and/or dimensions of the room that will house the laboratory automation system)

A "laboratory product" may refer to a variety of different containers that may be transported within a laboratory transport system. Examples of such containers include, but are not limited to, a test tube, a sample tube, a sample container, or any container that may be configured to hold a laboratory sample. In addition, a laboratory product may be capped or uncapped in different situations. Also in some embodiments of the invention, laboratory product may also be pre-centrifuged prior to being transported.

A "laboratory product transport element" may include a variety of different transport elements configured to transport a laboratory product within a laboratory transport system. A laboratory product transport element can transport a laboratory product (e.g., a sample tube) using any suitable mode of transport. Exemplary laboratory product transport elements may include devices which facilitate movement of the element, such as wheels. The transport element can transport one or more laboratory products (e.g., sample container with a sample in it).

A "laboratory transport system" according to an embodiment of the invention can include at least one laboratory product transport element according to an embodiment of the invention and a transfer path arrangement. A laboratory transport system may include a variety of different subsystems. For example, some laboratory transport systems may include a transfer path arrangement and one or more laboratory product transport elements. Some laboratory transport systems may be active transport systems, while others may be passive transport systems. An active transport system may include chain or belt conveyors upon which laboratory product transport elements are moved, or transport elements are moved along a path by the magnetic attraction of one or more magnets that are moved along the pre-determined path. Passive transport systems utilize self-propelled transport elements that can avoid the use of chain or belt conveyors or movable magnets, and instead move along transfer surfaces utilizing different movement components that are part of the laboratory product transport element itself.

A "transfer path" may refer to a variety of different surfaces within a laboratory transport system upon which a laboratory product transport element may travel. In some cases, a transfer path may include a smooth surface. An example of a transfer path may also include a track. A transfer path may be part of a transfer path arrangement that may include one or more transfer paths along with other features in some cases. Suitable examples of transfer paths may include a horizontal web with side limitations (e.g., walls) which can confine the movement of a laboratory product transport element. In some cases, the transfer path may have a marker (e.g., a line) which can be followed by a laboratory product transport element. Transfer paths may head in one or more directions.

A "transfer path arrangement" may include additional features, some of which may be active while others may be passive. A transfer path arrangement may include, but are not limited to, barriers, markers, indicators, sensors, transmitters, receivers, electrical conductors, power sources, electromagnetic radiation sources, and/or optical devices.

A "memory device" may be any suitable device that can store electronic data. A suitable memory device may comprise a computer readable medium that stores instructions that can be executed by a processor to implement a desired method. Examples of memory devices may comprise one or more memory chips, disk drives, etc. Such memory devices may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

FIG. 1 shows a top plan view of a portion of a laboratory automation system 100 that has a number of subsystems 104A-104C that are connected together with a transport system comprising a number of track segments 108A-108D. Laboratory product transport elements such as pucks can transport samples in sample containers between the various subsystems 104A-104C using the transport system. Details regarding specific laboratory product transport elements and transfer paths (e.g., track segments) for them may be found in U.S. patent application Ser. No. 14/117,434 entitled "System and Method Including Laboratory Product Transport Element" filed on May 11, 2012, which is herein incorporated by references in its entirety for all purposes. Each subsystem 104A-104C may include any suitable number or combination of subassemblies including robots, cameras, etc.

As illustrated in FIG. 1, the subassemblies 104A-104C and the track segments 108A-108D can be configured in many different ways. An end user may configure the track segments 108A-108D and the subsystems 104A-104C in any suitable manner. The manner in which they are arranged by the end user may depend upon predetermined spatial and/or processing constraints. An example of a spatial constraint may include the amount of available space which can be used to house the laboratory automation system. Examples of processing constraints may include the number of samples that need to be processed and/or the type of processing that is to be performed on the samples. For example, a particular user (e.g., a hospital) may need to be able to process a predetermined number of samples within a predetermined amount of time, with a certain percentage of those being short turnaround time (STAT) samples.

Figure 2A:
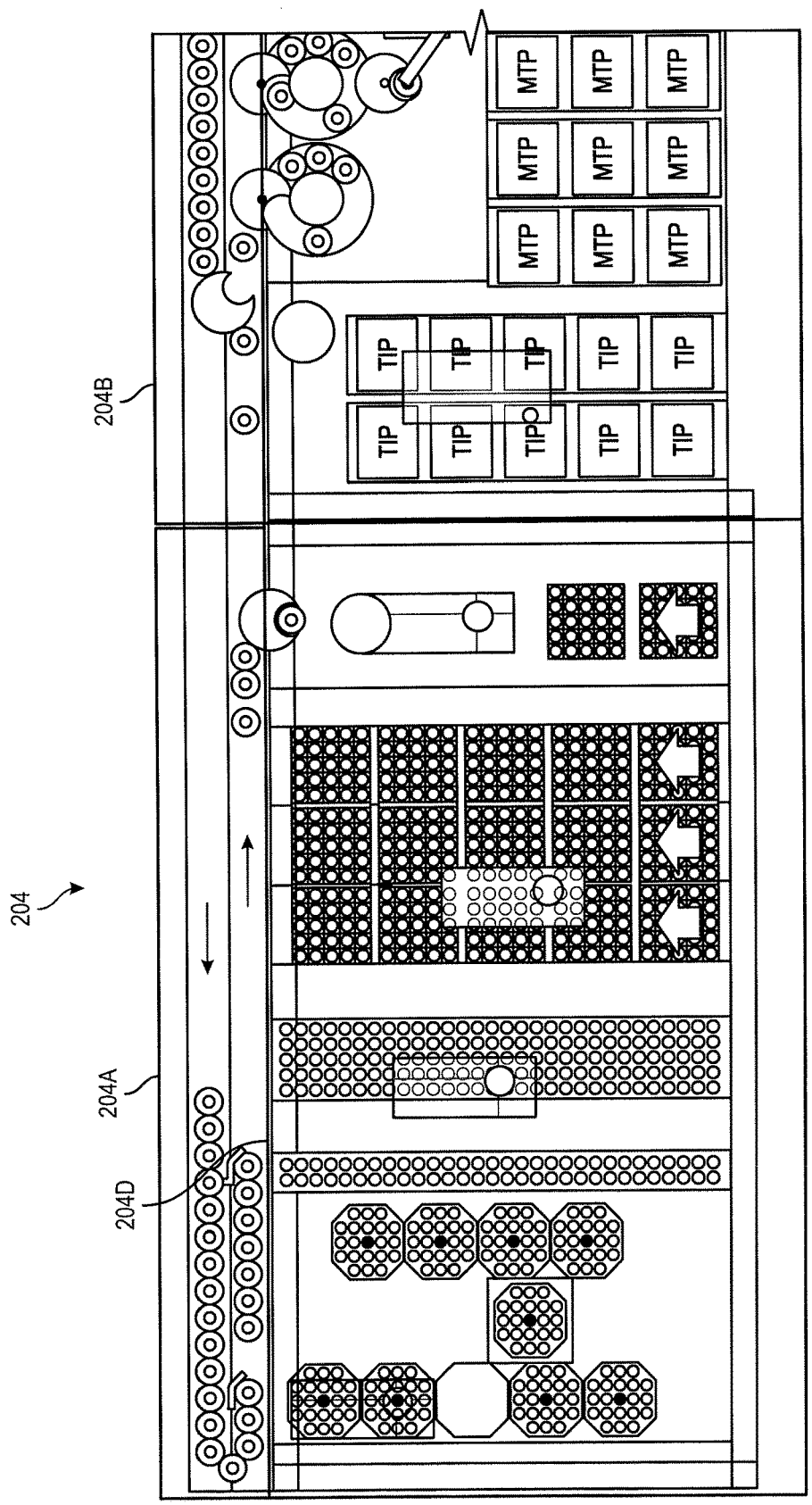
FIG. 2A shows a top plan view of a diagram of a laboratory automation system with boxes drawn around parts of the laboratory automation system.
Figure 2A:
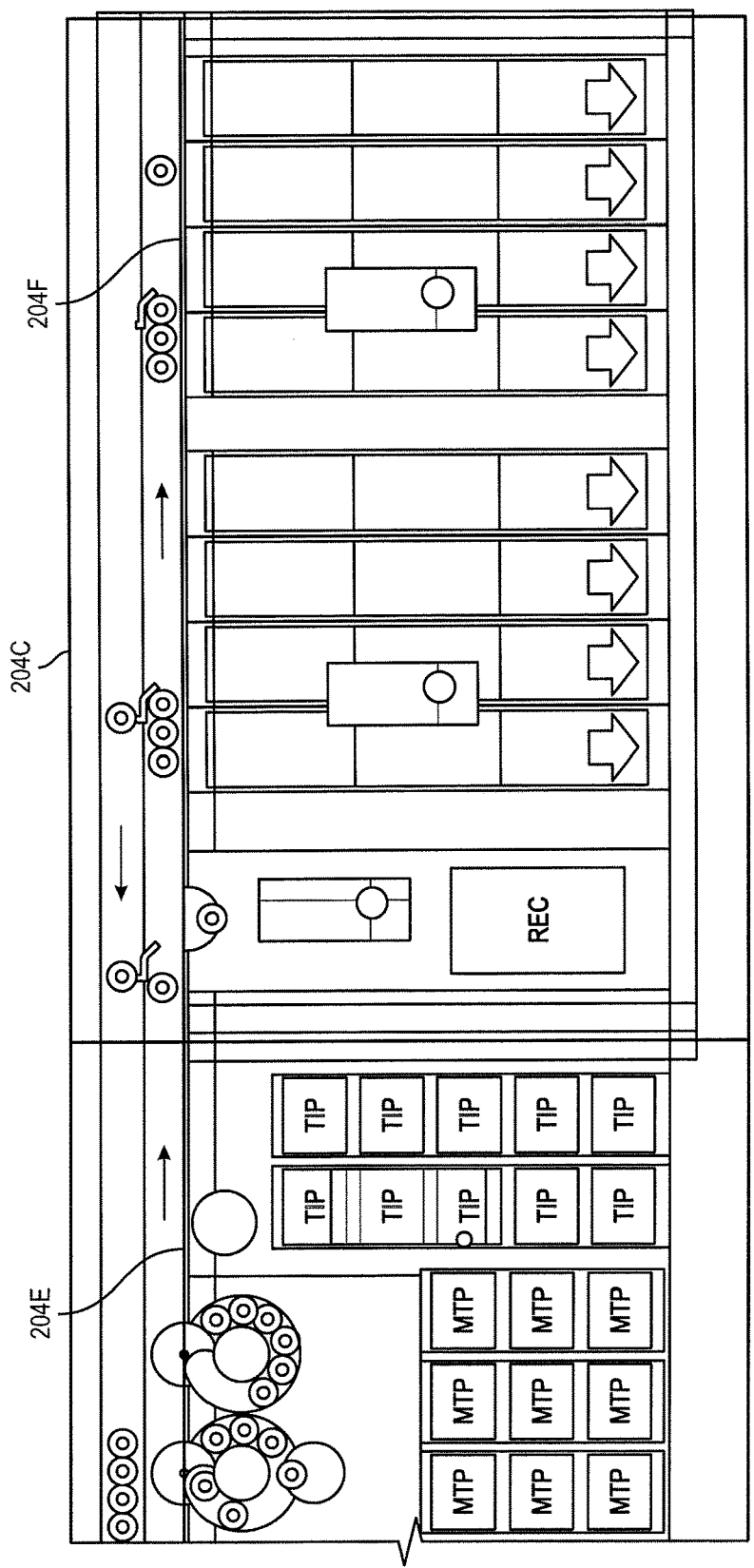

FIG. 2A shows a diagram of an exemplary laboratory automation system. The illustrated laboratory automation system includes six system blocks. The six system blocks include a first system block 204A, a second system block 204B, and a third system block 204C. In this example, the first, second and third system blocks 204A, 204B, 204C may be transport sections that consist of tracks that are used to guide laboratory product transport elements. A fourth system block 204D, a fifth system block 204E, and a sixth system block 204F are respectively associated with the first, second, and third system blocks 204A, 204B, and 204C. The fourth, fifth, and sixth system blocks 204D, 204E, 204F may have subassemblies which may process samples in sample containers. In this example, the fourth, fifth, and sixth system blocks 204D, 204E, 204F may be characterized as centrifuge, aliquoter, and output system blocks, respectively.

It is understood the laboratory automation system shown in FIG. 2A is for illustration purposes only, and that other laboratory automation systems may have more or less, or different types of system blocks, than the specifically described system blocks.

Figure 2B:
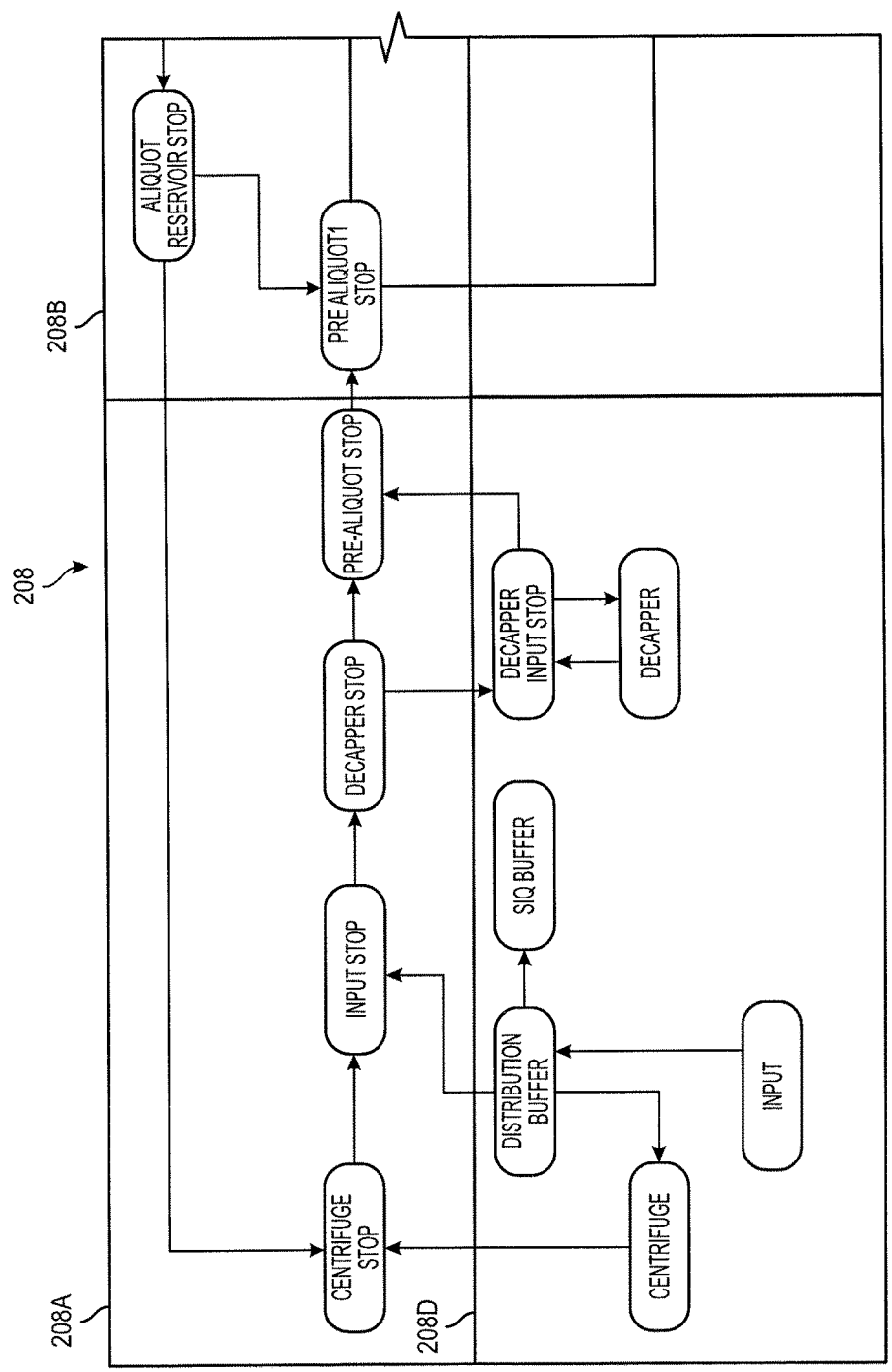
FIG. 2B shows a site graph with boxes drawn around subgraphs which correspond to the parts of the laboratory automation system in FIG. 2A.
Figure 2B:
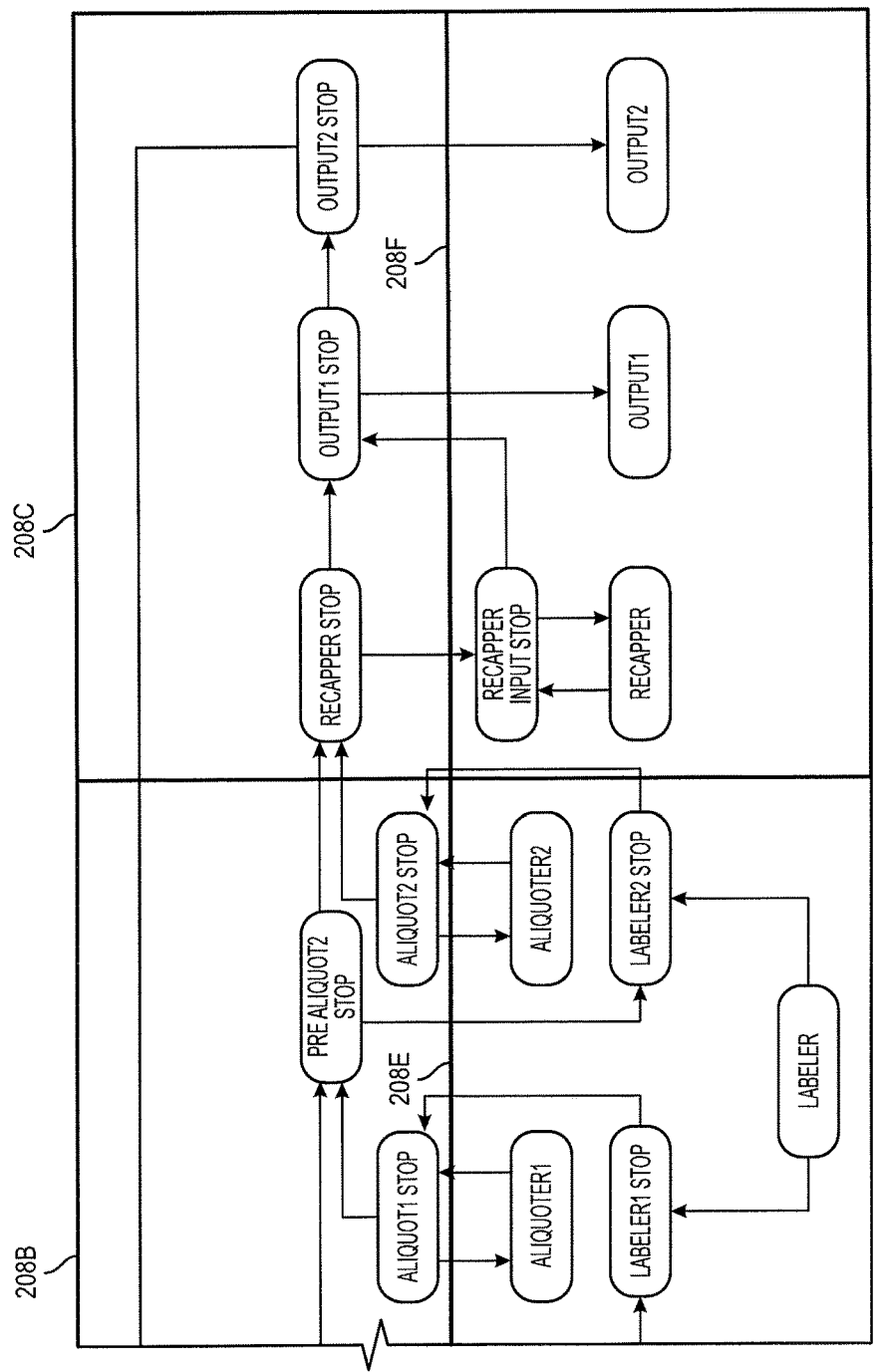

FIG. 2B shows a number of processing, buffer, and transport nodes associated with a site graph 208 for the laboratory automation system shown in FIG. 2A. The nodes may be connected by edges which may represent paths of travel for samples or laboratory product transport elements carrying the samples. The arrows in the site graph 208 show potential directions of travel for laboratory product transport elements in the laboratory automation system.

The site graph 208 can be divided into subgraphs 208A-208F, which may correspond to the system blocks in FIG. 2A. For example, a first, second and third subgraphs 208A, 208B, 208C may be associated with the first, second and third system blocks 204A, 204B, and 204C. The fourth, fifth, and sixth subgraphs 208D, 208E, 208F may correspond to the fourth, fifth, and sixth system blocks 204D, 204E, 204F.

In this example, the first, second, and third system blocks 204A, 204B, 204C may contain only tracks to support the transport of laboratory product transport elements.

The first subgraph 208A may correspond with the first system block 204A, and may comprise a number of transport nodes including a centrifuge stop, an input stop, a decapper stop, and a pre-aliquot stop, respectively downstream of each other in that order.

The second subgraph 208B may correspond to the second system block 204B, and may contain transport nodes comprising a first pre-aliquot stop, a second pre-aliquot stop, a first aliquot stop, and a second aliquot stop. The first pre-aliquot stop may be upstream of the second pre-aliquot stop. The first aliquot stop may be upstream of the second pre-aliquot stop. A pre-aliquot stop may be a location where a laboratory product transport element stops before it reaches an aliquot stop. An aliquot reservoir stop may be upstream of the first pre-aliquot stop, and may also be upstream of the centrifuge stop in the first system block 208A.

The third subgraph 208C may correspond with the third system block 204C, and may contain a number of transport nodes comprising a recapper stop, a first output stop, and a second output stop, respectively downstream from each other in that order.

The fourth subgraph 208D corresponds to a fourth system block 204D and includes a transport node including a decapper input stop downstream of the decapper stop and upstream of the pre-aliquot stop in the first system block 204A. The fourth system block 204D also includes a number of processing nodes including a decapper in communication with the decapper input stop, and a centrifuge downstream of a distribution buffer in the fourth system block 208D and upstream of the centrifuge stop in the first system block 208A. The fourth system block 204D may also include a number of buffer nodes including an input area, a distribution buffer, an SIQ (sample in question) buffer.

The fifth subgraph 208E corresponds to a fifth system block 204E, and includes a number of transport nodes including a first labeler stop and a second labeler stop. The first and second labeler stops may be upstream of and may feed laboratory product transport elements to the first and second aliquoter stops in the second subgraph 208B. The labeler stops may be in communication with processing nodes including a labeler node. First and second aliquoter nodes may also be present in the fifth subgraph 208E, and may be in communication with the first and second aliquoter stops in the second subgraph 208B.

The sixth system subgraph 208F corresponds to a sixth system block 204F. The sixth subgraph 208F may include a transport node including a recapper input stop, as well as a number of processing nodes including a recapper node, and first and second output nodes. The recapper input stop is in communication with the recapper processing node.

As shown in FIG. 2B, the different nodes within subgraphs and between adjacent subgraphs may be connected with edges representing transfer paths. As will be described in further detail below, transfer paths ending at pseudo nodes of adjacent subgraphs can be stitched together. Virtual representations of the subgraphs and the corresponding system blocks may be stored in a catalog database, and they can selected as desired by an end user in designing a laboratory automation system.

Although FIGS. 2A and 2B show a number of specific processing and transport nodes, embodiments of the invention are not limited to these particular nodes, particular hardware configurations, or laboratory product transport element travel paths.

Figure 3:
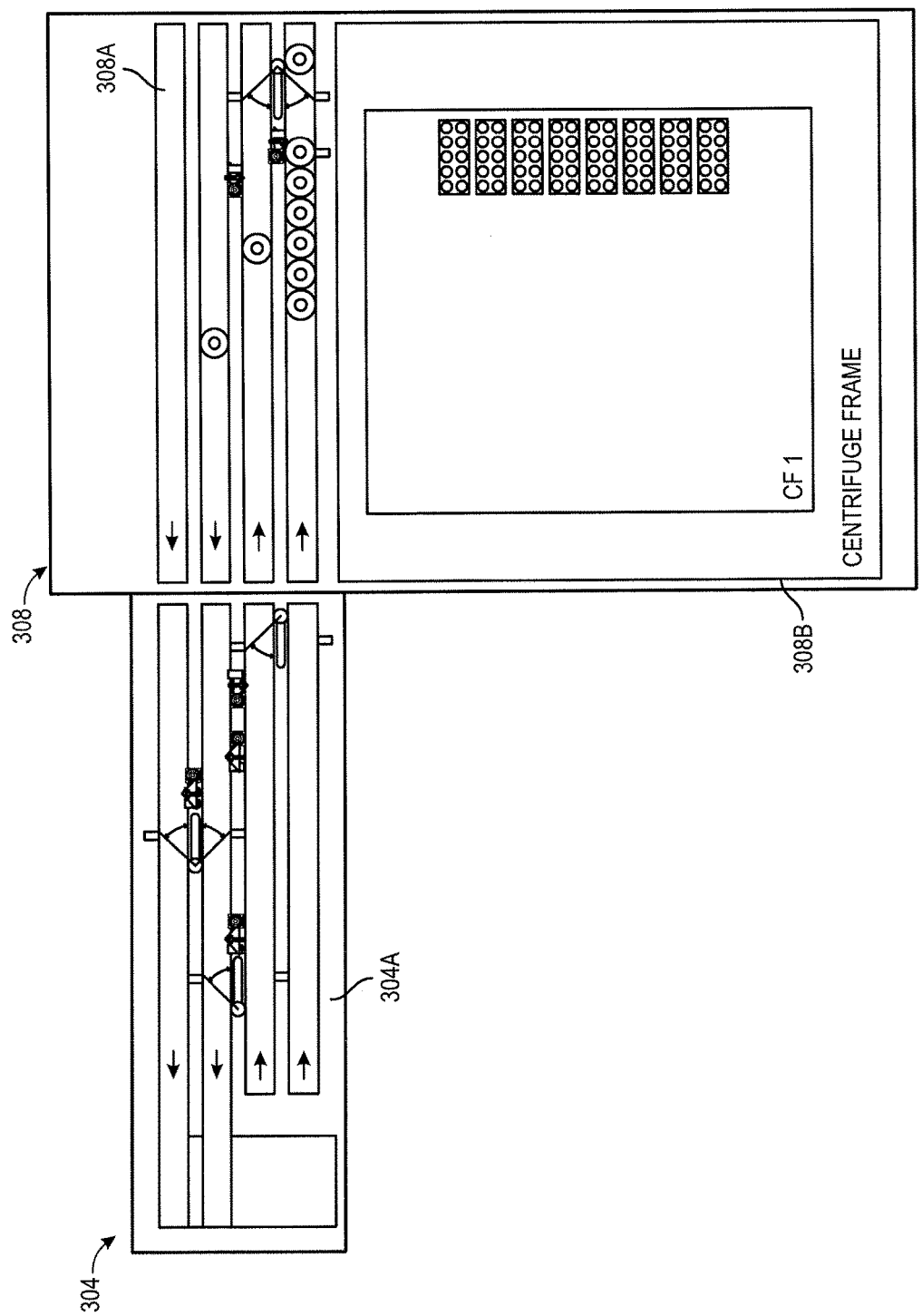
FIG. 3 shows a top plan view of two exemplary system blocks in a laboratory automation system.

FIG. 3 shows two system blocks for illustrative purposes. The first system block 304 includes a first track section 304A, while a second system block 308 includes an instrument (e.g., a centrifuge) 308B coupled to a corresponding second track section 308A. In other embodiments, a system block could have multiple instruments coupled together with or without corresponding track sections. The first and second track sections 304A, 308A may be coupled together (e.g., electrically and/or mechanically) so that laboratory product transport elements can travel between them. FIG. 3 shows that system blocks may be used to solely transport samples, process samples and transport samples, or only process samples.

Figure 4:
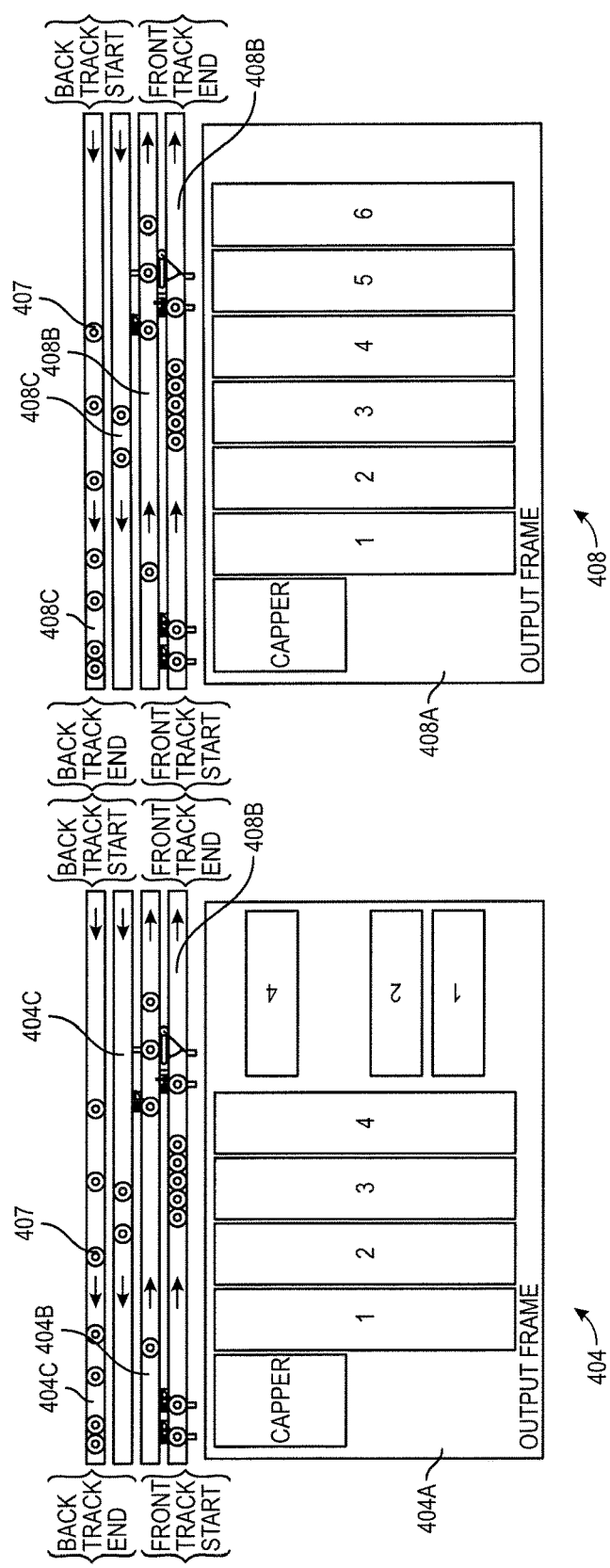
FIG. 4 shows top plan view of exemplary system blocks connected together.
Figure 5:
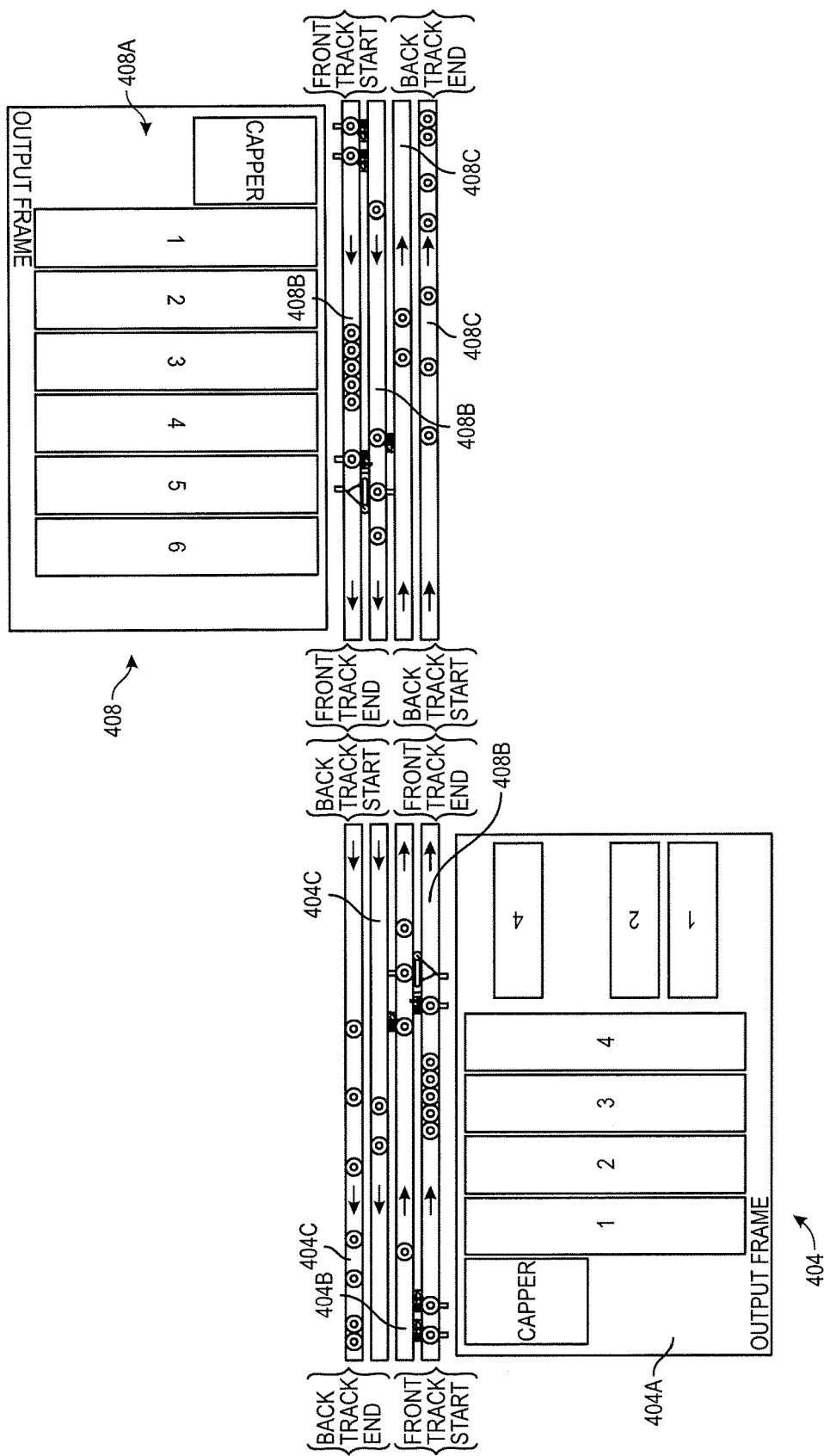
FIG. 5 shows a top plan view of step system blocks connected together, but in a different manner than shown in FIG. 4.

FIGS. 4 and 5 illustrate how two system blocks 404, 408 can be arranged and rearranged using embodiments of the invention.

FIG. 4 shows a first system block 404 and a second system block 408 joined together. Each system block 404, 408 may include an output frame 404A, 408A with drawers and a capper. As shown, two front tracks 404B, 408B associated with the first and second system blocks and two back tracks 404C, 408C may be joined together. A number of laboratory product transport elements (e.g., pucks) 407 may pass between the system blocks 404, 408 via the tracks 404B, 404C, 408B, 408C.

FIG. 5 shows the same system blocks 404, 408, but the second system block 408 is reversed relative to its position in FIG. 4, so that the output frame 408A is on the opposite side of the tracks 404B, 404C, 408B, 408C as the output frame 404A. As shown, front tracks 404B associated with the system block 404 may be joined to the back tracks 408C of the system block 408. Also, the back tracks 404C of system block 404 may be joined to the front tracks 408B of the system block 408. A number of laboratory product transport elements may pass between the system blocks 404, 408 via the tracks.

As illustrated in FIGS. 4-5, using embodiments of the invention, system blocks can be rearranged relative to each other to produce different laboratory automation system configurations. The subgraphs associated with these system blocks 404, 408 can be automatically stitched together, once the end user determines how the system blocks 404, 408 are arranged with respect to each other. The function of the system blocks 404, 408 may be simulated based upon how they are arranged. Different arrangements of system blocks can be arranged and their operations simulated with respect to each other using computer software before they are joined and used in practice.

Figure 6:
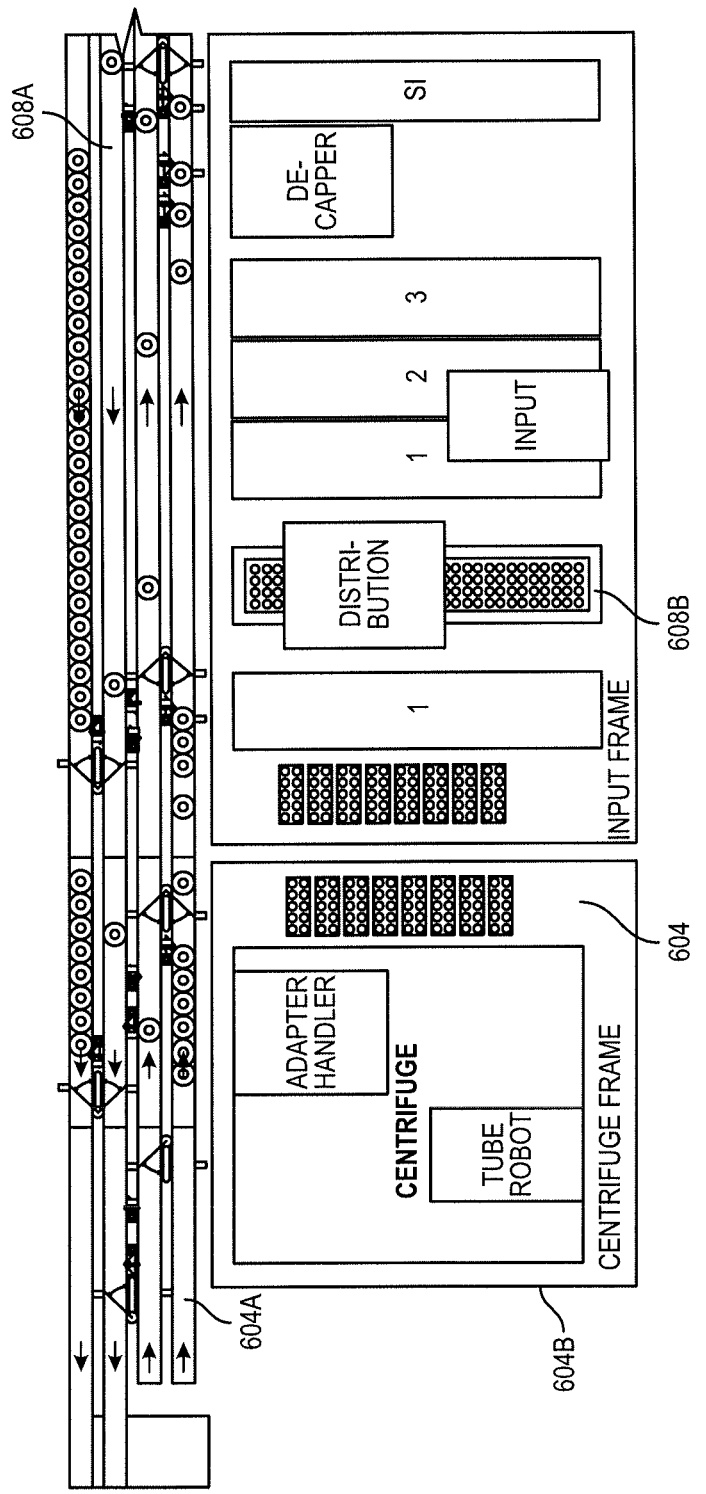
FIG. 6 shows a top plan view of another exemplary laboratory automation system according to an embodiment of the invention.
Figure 6:
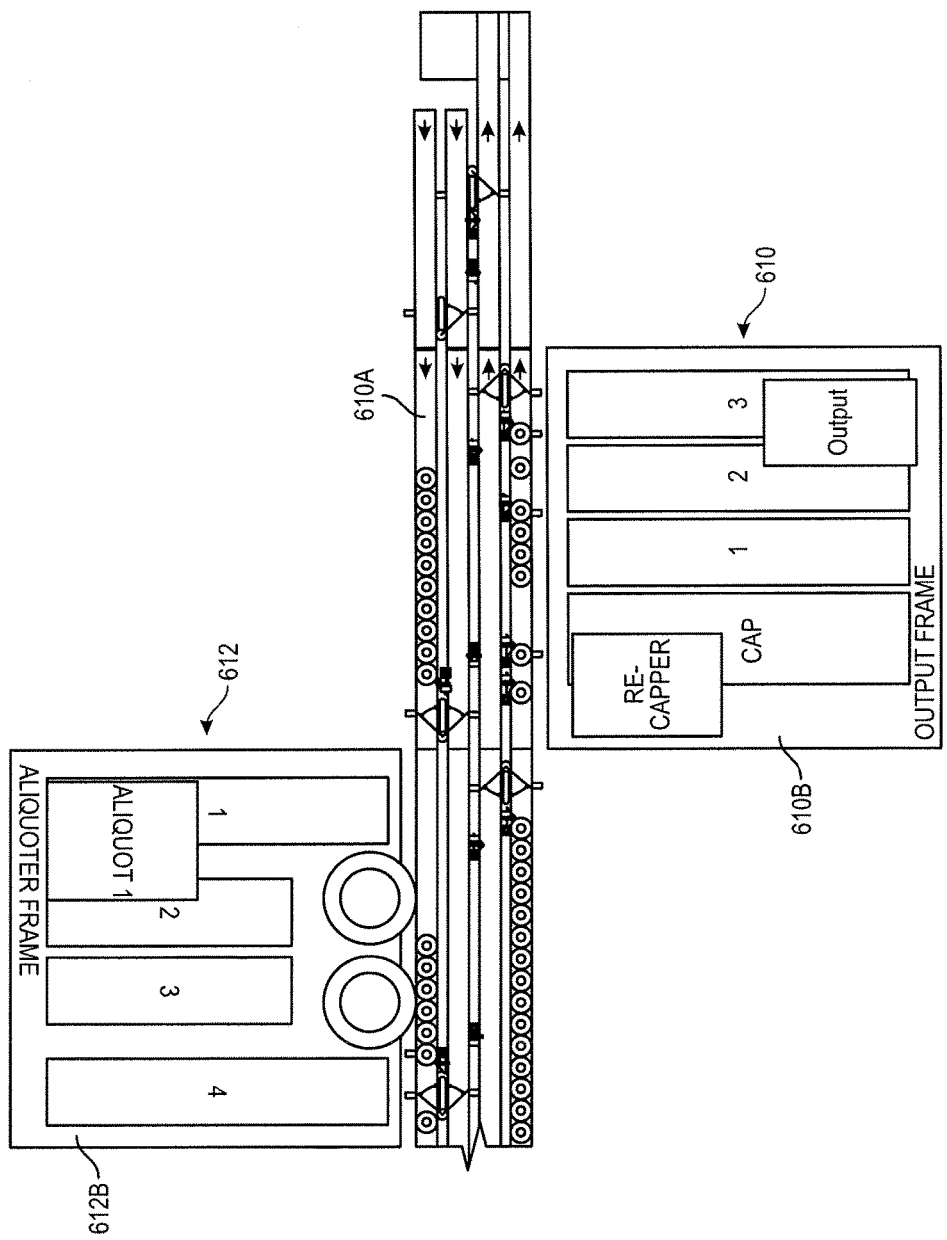

FIG. 6 shows another system including a first system block 604, a second system block 608, a third system block 610, and a fourth system block 612. The first system block 604 may comprise a first track section 604A and a centrifuge frame 604B coupled to the first track section 604A. The centrifuge frame 604B may comprise a centrifuge, a tube robot, and an adapter handler. The second system block 608 may comprise a second track section 608A and an input frame 608B coupled to the second track section 608A. The input frame 608B may comprise a number input drawers, a distribution buffer, and a decapper. The third system block 610 may comprise a third track section 610A and an output frame 610B coupled to the third track section 610A. The output frame 610B may comprise a recapper, a number of drawers, and an output section. The fourth system block 612 may comprise a fourth track section 612A and an aliquoter frame 612B coupled to the fourth track section 612A. In this example, the aliquoter in the aliquoter frame 612B is on the opposite side of the transport sections as the other instruments of the system. In this example, the processing subsystems in the first, second, and third system blocks are on the same side of the connected transport subsystems. The fourth system block has a processing subsystem that is on the side of the connected transport subsystems opposite to processing subsystems in the first, second, and third block systems 604, 608, 610, 612. Depending upon the desire of the end user, the arrangement of the processing subsystems in any of the block systems 604, 608, 610, 612 may be reversed.

Figure 7A:
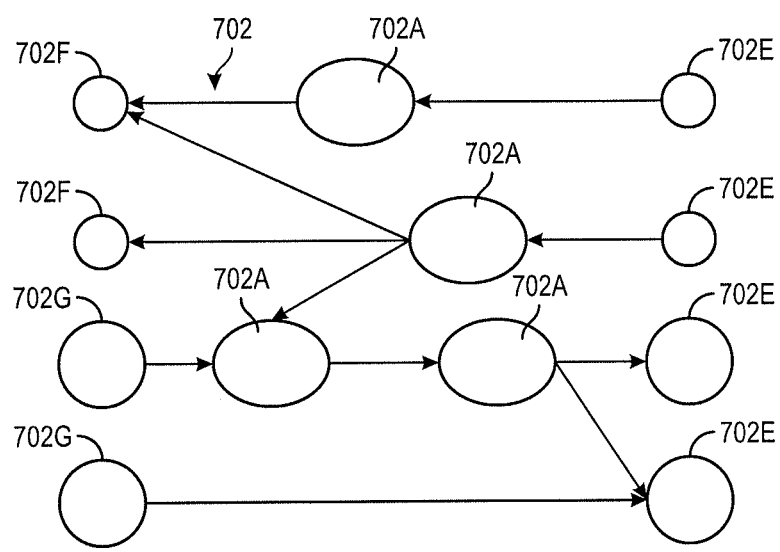
FIG. 7A-7C show diagrams of separate subgraphs that can be stitched together.
Figure 7B:
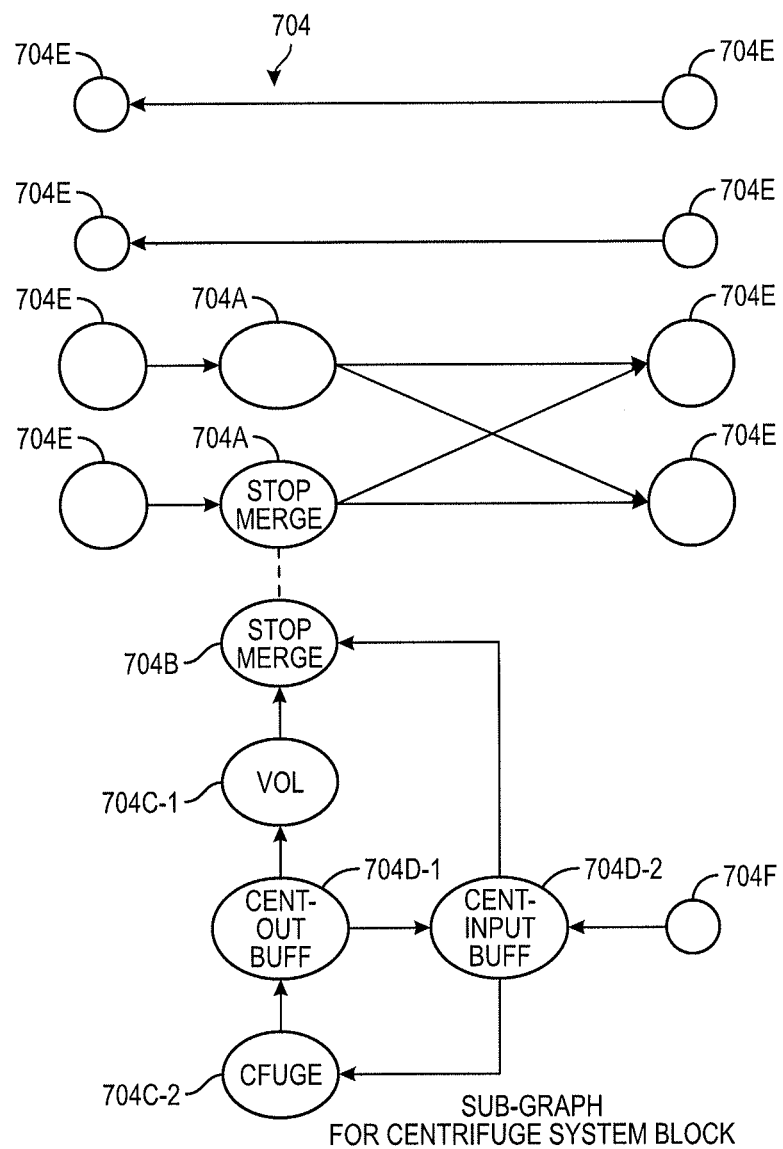
Figure 7C:
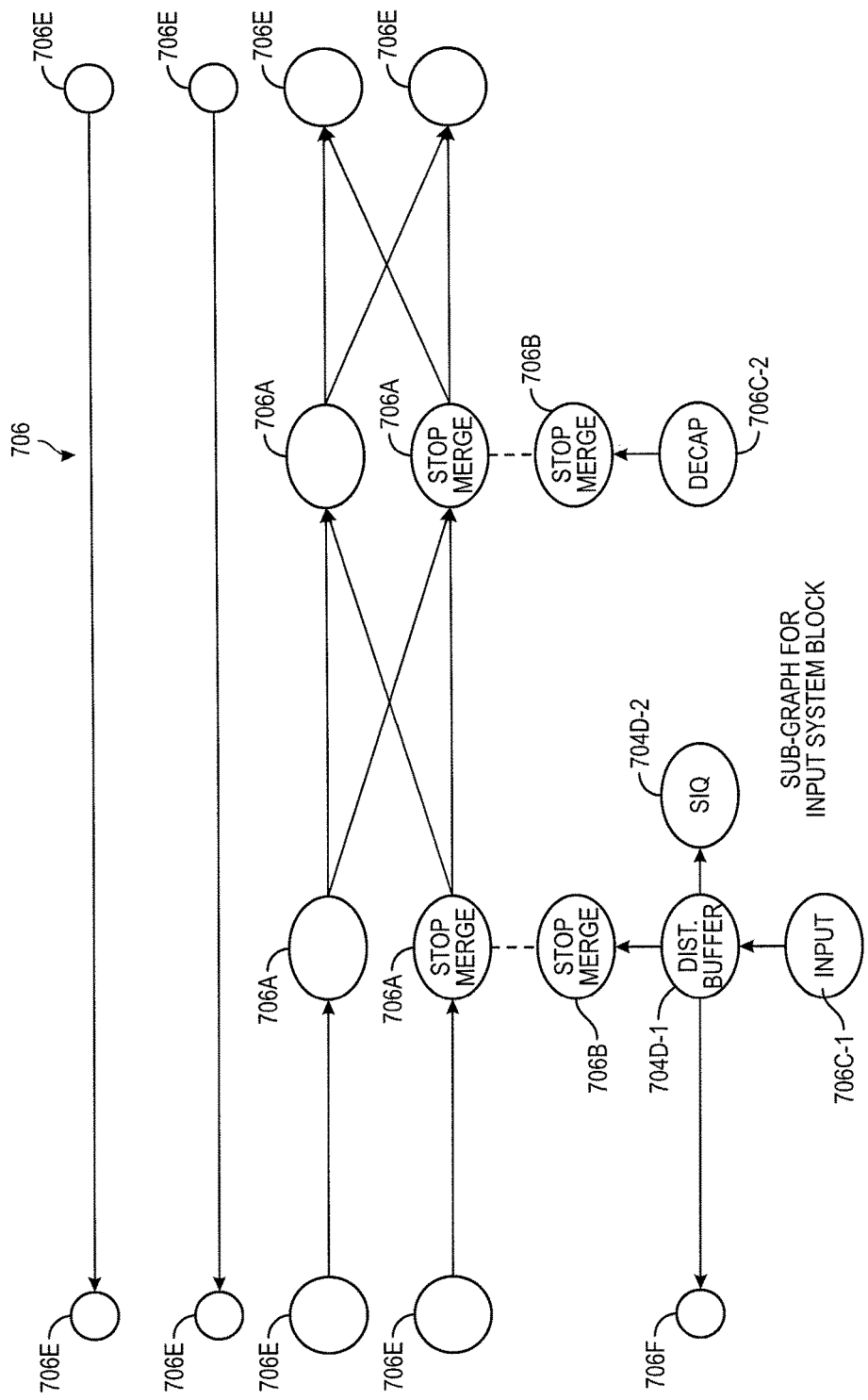

FIGS. 7A-7C respectively show a plurality of subgraphs 702, 704, 706 that may exist separately before they are stitched together. The subgraphs 702, 704, 706 may correspond to different system blocks.

FIG. 7A shows a first subgraph 702 for a track end system block, which may include a plurality of transport nodes 702A. Each transport node 702A may be a location where a laboratory product transport element either stops or changes direction. The subgraph 702 may also include a number of pseudo nodes 702E, 702F, and 702G. The pseudo nodes 702F, 702G may correspond to ends of the track sections. The other pseudo nodes 702E may be stitched to other pseudo nodes. The edges in the first subgraph 702 can correspond to paths that a laboratory product transport element may travel.

FIG. 7B shows a second subgraph 704 for a centrifuge system block including pseudo nodes 704E, 704F. Two transport nodes 704A are between two respective pseudo nodes 704E. Node 704B may be another transport node, while nodes 704C, 704D may be processing nodes. The nodes 704A, 704B labeled "stop merge" may physically be the same point where a laboratory product transport element is transferred between a centrifuge and a track. Node 704C-1 may be for volume determination, while node 704C-2 may be for centrifuging. Node 704D-1 can be for centrifuge output buffer while node 704D-2 may be for a centrifuge input buffer. Pseudo node 702F may be connected to the centrifuge input buffer 704D-2.

FIG. 7C lastly shows a third subgraph 706 for an input system block. It includes pseudo nodes 706E, 706F as well as a number of transport nodes 706A, 706B. The nodes labeled "stop merge" that are adjacent to each other (as indicated by a dotted line) may be the sample physical point where transfer of a laboratory product transport element occurs between a track and a distribution buffer 704D-1 and a decapper 706C-2. It may also comprise a number of processing nodes including an input node 706C-1 and a decap node 706C-2. It may also comprise a number of buffer nodes including a distribution buffer 704D-1 and a sample in question buffer 704D-2.

Figure 8:
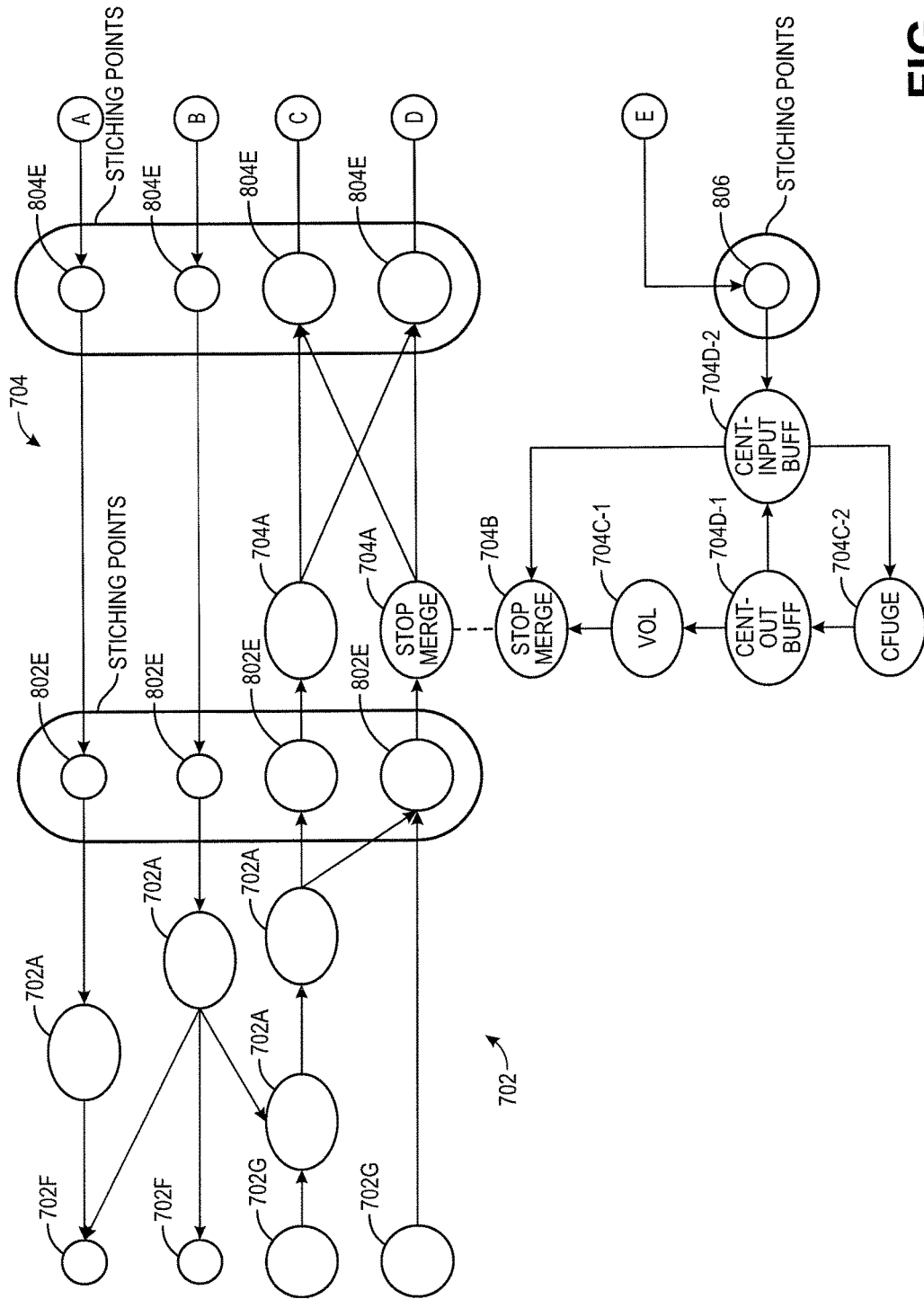
FIG. 8 shows three subgraphs being stitched together through stitching points.
Figure 8:
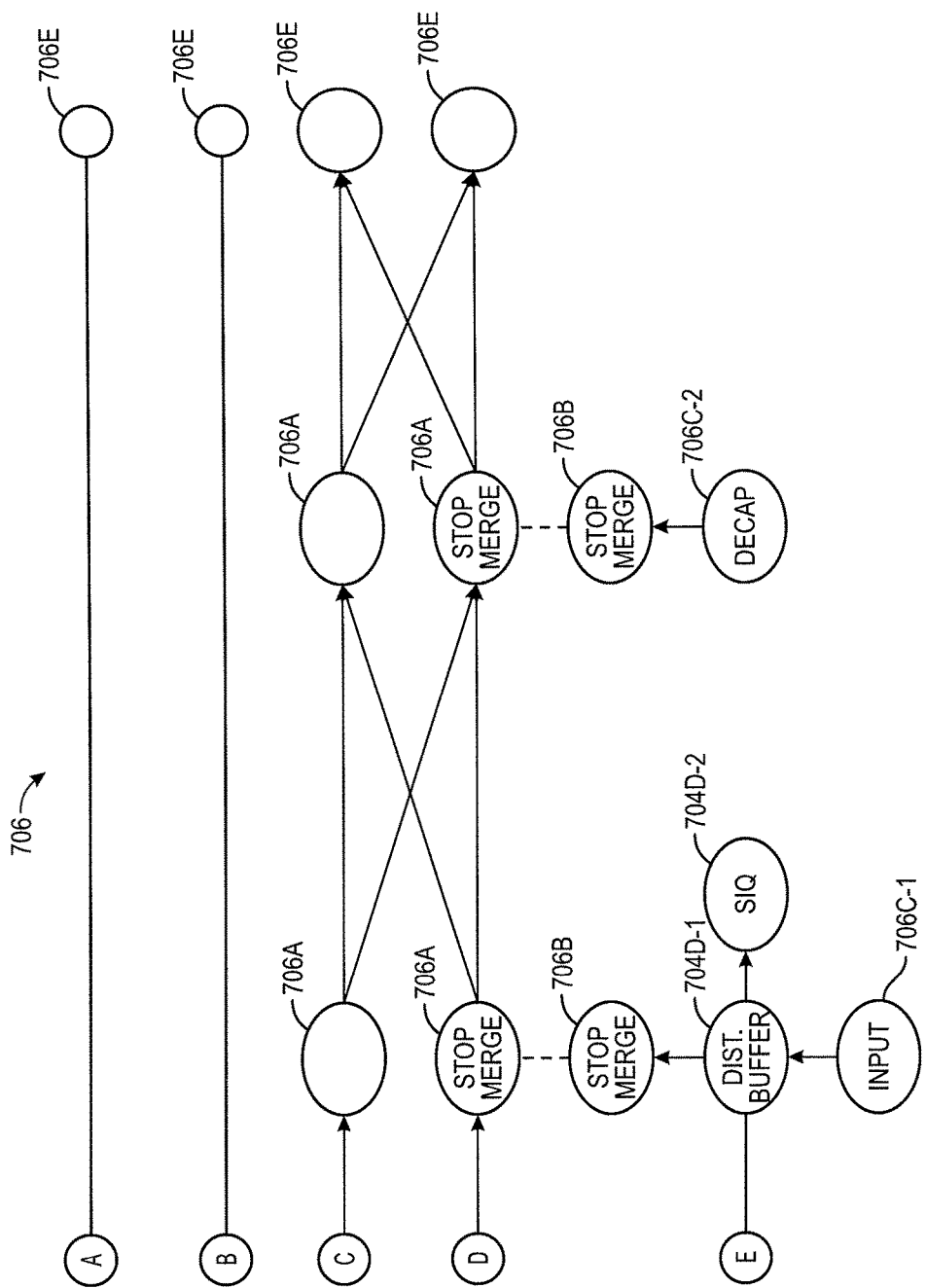

FIG. 8 shows the stitching of the first, second and third subgraphs 702, 704, 706 together. As shown, pseudo nodes 702E from the first subgraph 702 and pseudo nodes 704E from the second subgraph 704 are stitched together to form stitching points 802E. As shown, pseudo nodes 704E from the second subgraph 704 and pseudo nodes 706E from the third subgraph 706 are stitched together to form stitching points 804E. Further, pseudo node 704F in the second subgraph 704 and pseudo node 706F in the third subgraph 706 are joined to form stitching point 806.

Figure 9:
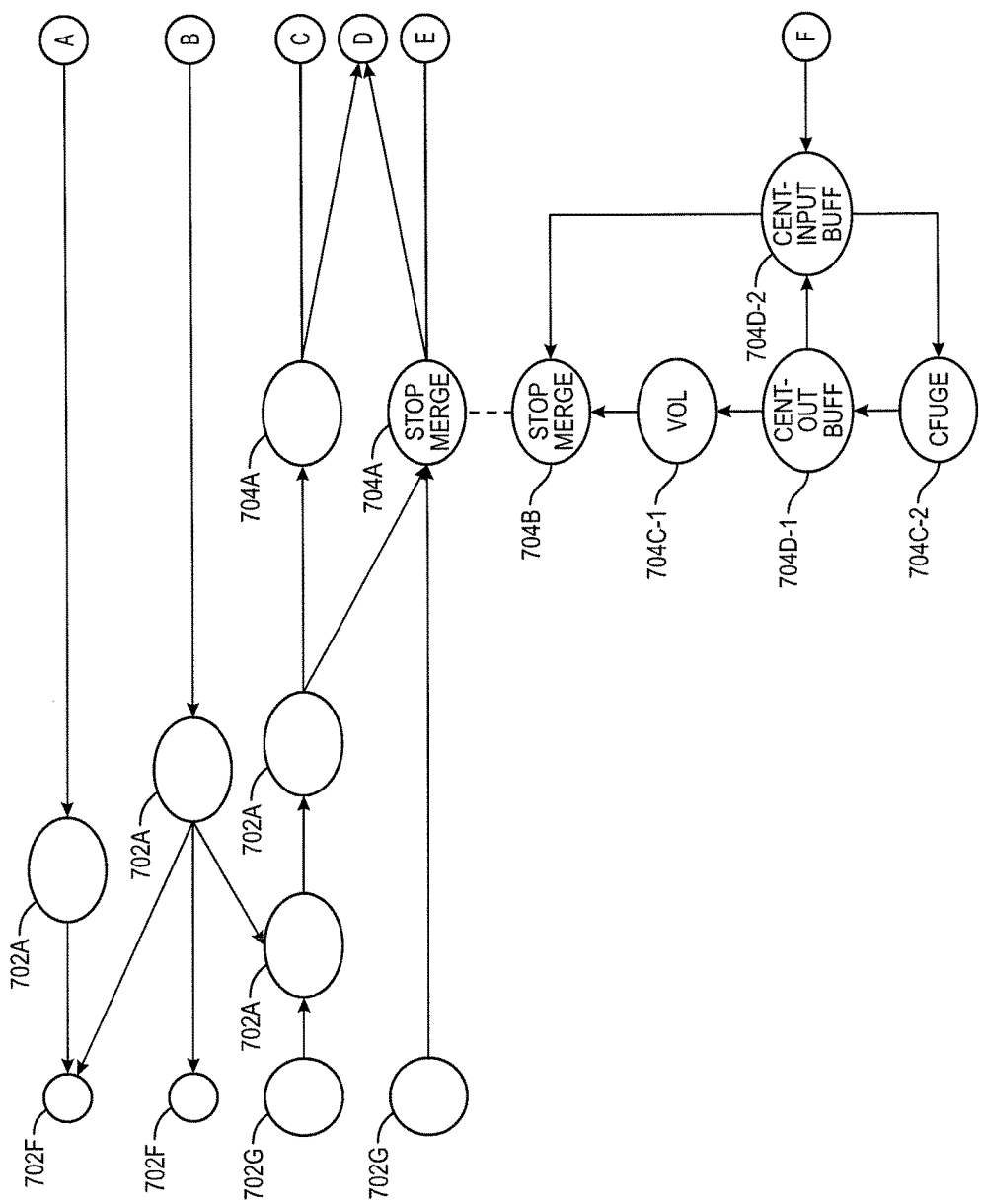
FIG. 9 shows a diagram of a site graph that was formed by stitching together the subgraphs shown in FIGS. 7-8.
Figure 9:
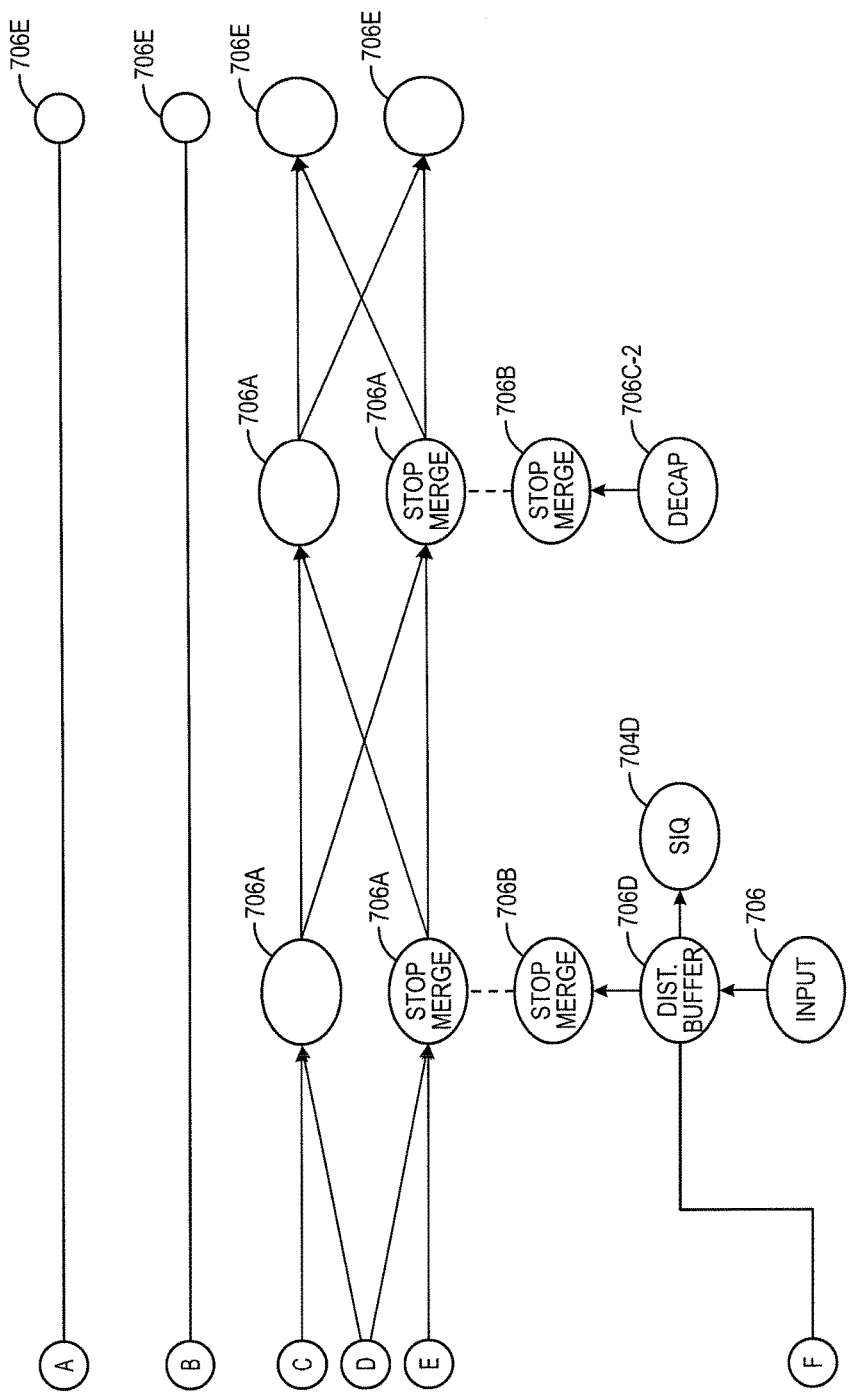

FIG. 9 shows a site graph that is formed by stitching the first, second and third subgraphs 702, 704, 706 together. As shown in FIG. 9, the stitching points 802E, 804E, and 806 shown in FIG. 8 are no longer present. Each node of the site graph may represent different processes or functions that may be performed on the sample, sample container, or laboratory product transport element that carriers the sample container or sample.

In some embodiments, the different nodes may be controlled by different layers of software. U.S. patent application Ser. No. 14/074,069, filed on Nov. 7, 2013, entitled "Automated Sample Processing System," which is by the same assignee as the present application and is incorporated by reference in its entirety for all purposes, describes layers of software including a workflow management layer (WML), a process control layer (PCL), a middle control layer (MCL), and a device control layer (DCL). Each of these software layers may perform different functions on the different nodes in the site graph. For example, the WML may provide instructions to decapper at a decapper node, while the MCL may control transport nodes within the site graph.

The WML can be the top level or view to the user, utilizing the sample processing rules specified in its rules engine to determine the process plan that will be run on the sample. For laboratories with multiple LAS (laboratory automation system) lines, the WML can allow each line to be configured with a different workflow management scheme and can concurrently manage multiple active workflows. Upon startup, the WML can communicate the configuration data to the PCL and notify the PCL of any additional changes to the configuration data after startup.

During operation, the WML generates the process route for a single sample container and provides this process plan to the PCL. The route plan comprises a list of processing instructions that may be in a given order. The method also comprises determining, by the at least one processor using the process control layer, an optimized route through the sample preparation system and to each of the required analyzers, according to the route plan and according to the availability of the sample preparation system and the priority of the sample, using the process control layer (PCL), and processing the sample using the optimized route.

In some embodiments, the middle control layer (MCL) may further receive route legs from the PCL to process, and these route legs may be further optimized by the MCL. The MCL may operate independently of the PCL and the WML in embodiments of the invention.

The MCL could also provide specific instructions to the DCL (which may provide instructions to specific device firmware to control the operation of the specific subassemblies.

Figure 10:
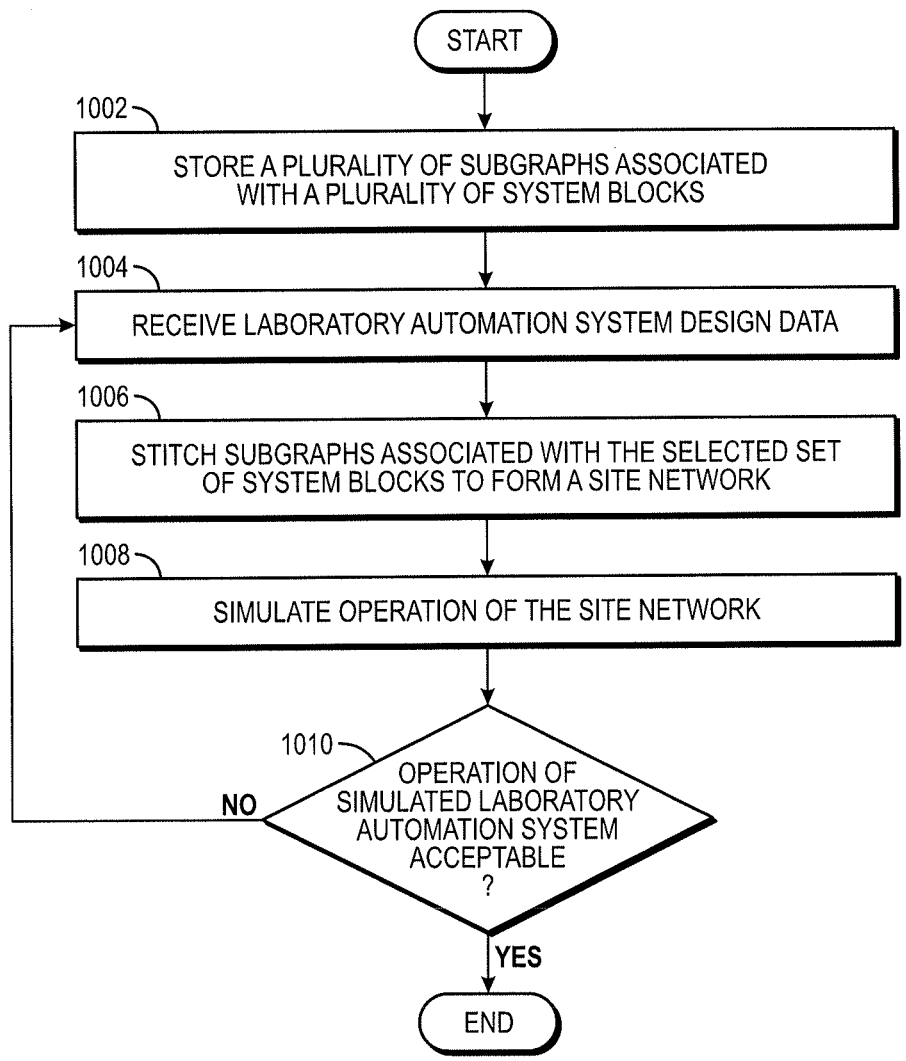
FIG. 10 shows a flowchart illustrating a method according to an embodiment of the invention.

FIG. 10 shows a flowchart illustrating a method according to an embodiment of the invention. The method in FIG. 10 begins by storing, by a processor, in a database, a plurality of subgraphs associated with a plurality of system blocks (step 1002). As described above, each subgraph comprises site nodes, edges, and pseudo nodes associated with at least one subassembly. The database may store virtual representations of hundreds of different system blocks and their subgraphs. The storing step may be performed by a catalog manager computer, which is described in further detail below.

The method also comprises receiving, by the processor, laboratory automation system design data for a laboratory automation system (step 1004). The laboratory automation design data may specify any suitable characteristic of the laboratory automation system to be formed. For example, it may include the number and/or types of system blocks to incorporate as well as their arrangement relative to each other.

Suitable laboratory automation system design data may include any suitable type of data that can be used to customize the creation of a laboratory automation system and simulate its operation.

In some embodiments, laboratory automation design data may include data relating to selected system blocks and subgraphs to be used in a proposed laboratory automation design system. It may also include the particular arrangement or configuration of those system blocks and/or subgraphs relative to each other, as well as relative to any suitable external parameters such as process constraints (e.g., the number and/or type of assays to be run on the proposed system) or physical constraints (e.g., the size and/or dimensions of the room that will house the laboratory automation system).

The laboratory automation design data may also include data relating to any constraints that may be present in building the system. Examples of such constraints may include process constraints (e.g., the number and/or type of assays to be run on the proposed system, the expected throughput and/or turnaround time, etc.) or physical constraints (e.g., the size and/or dimensions of the room that will house the laboratory automation system)

In some embodiments, the user's needs can be embodied in a manifest file that is created by the user. When designing a new laboratory automation system, or when altering an existing configuration, the user provides desired parameters such as system performance/throughput, power requirements, logical layouts and floor layouts. Such information may be included in laboratory automation system design data. Further details regarding the manifest file are provided below.

After the laboratory automation design data is received by the processor, the processor stitches the subgraphs associated with the system blocks specified in the laboratory automation system design data together to create a site network for the laboratory automation system (step 1006). Exemplary stitching processes are described above, and also below with respect to FIG. 11.

The system blocks can be stored in a master system block catalog database (described in further detail below with respect to FIG. 12). The system block database comprises information about all supported system blocks or devices and their respective subgraphs. It is also connected to and is able to retrieve and update its content from remotely located servers and manufacturing systems.

When creating the system layout, the system builder computer can optimize the layout of system blocks to meet user requirements in the most desired manner. For example, the layout may be chosen so that the minimum transport path lengths are achieved. Also the layout can be improved such that it is avoided that samples cross paths needlessly and cause traffic and reduce TAT. Further, the layout can be improved with respect to carrier availability by introducing reservoirs of carriers near where they are needed, because if reservoirs are not strategically placed then carriers will need to travel long distances, thereby adding to traffic and adding delays to the analyzer/instrument throughput. Also the usage of high throughput and low throughput analyzers can be optimized, for this the layout may consider analyzer sampling time so that slower analyzers do not slow down the performance of faster analyzers.

After optimization, the manifest file can be generated. It can comprise information on regarding the system blocks needed to build the system and information regarding the version and/or generation of those system blocks. In embodiments of the invention, this manifest file can be independent from the version of the system blocks or software used, so the same manifest file may be used for updating software on systems that have previously been deployed. In other embodiments of the invention, the manifest file may make reference to version numbers for system blocks or any software associated with the system blocks.

From this manifest file, the wiring of the system, the required system blocks and the assignment of PLCs to system blocks as well as the spatial layout information can be derived. For example, a wiring plan can be created to assist a service engineer with installation of the newly designed system.

As noted above, the result of a stitching operation is a site network that represents the combined operation of multiple system blocks. As described above, each transport or processing node in a subgraph may be associated with a software routine that is used to perform an action associated with the node (e.g., operating a motor to run a centrifuge). The software routine may be implemented in any suitable manner, such as a function, linked library, or shared object. Each edge in the subgraph represents the movement of a sample between transport and/or processing nodes. When subgraphs are combined into a site network, the software routines associated with the transport and processing nodes may remain the same, while the edges between the subgraphs enable movement of a sample between system blocks. Thus, the stitching of subgraphs into a site network allows a combined software program for the laboratory automation system to be automatically generated.

Once the site network for the proposed laboratory automation system has been formed, the operation of the site network is simulated (step 1008). For example, a number of different system configurations can be formed by combining different types and numbers of transfer paths and subassemblies in different ways. Various types of samples with different types of processing characteristics (e.g., normal processing, short turnaround time or "STAT" processing) and different route plans can be virtually run through the different system configurations to see how they process samples. Processing delays and other problems can be identified by virtually running these virtual simulated laboratory automation systems, before the systems are actually built.

If the operation of the simulated laboratory automation system is not acceptable, then additional and/or different laboratory automation design data may be provided to the processor (step 1010). If the operation of the simulated laboratory automation system is acceptable, then the process may end.

The result of the simulation of a laboratory automation system can be unacceptable or unsatisfying for a number of reasons. Such reasons may include the formation of bottlenecks in the transportation of laboratory product transport elements at one or more locations within the sample processing system. For example, after joining a number of system blocks, the simulation may indicate that there are an insufficient number of centrifuges, because the number of sample containers entering a buffer zone prior to a centrifuge in the system is too high. Other reasons may include over-capacity in a particular area of the sample processing system. For example, one area in a sample processing system may a number of analyzers that are underutilized indicate that too many analyzers may be present. Also, in some cases, it may turn out that the processing of a high priority sample/STAT sample may be too slow under a simulated system load containing normal and STAT samples. In yet other cases, it may turn out that a particular device (e.g., a robot or refrigerator) may be used more frequently than expected. This may necessitate the need to reduce the time or frequency of any service intervals or look for a device that can process samples at a higher throughput.

In embodiments of the invention, the site graph and/or the system blocks described and shown herein may be shown to a user via a graphical user interface. The system blocks may be combined in a manner desired by the user, and the operation of the combined system blocks may be shown to the user so that the user can visualize the operation of the proposed system.

Once an acceptable system designed is determined, a list of parts (e.g., subsystems, conveyors, etc.), prices, wiring, etc. may be automatically generated by the system builder computer. This list of parts may then be used in any number of ways. For example, the list of parts may be manually or automatically provided to a supplier computer, which may then coordinate the shipment of the parts to the location in which the user wishes to use the new system.

Figure 11:
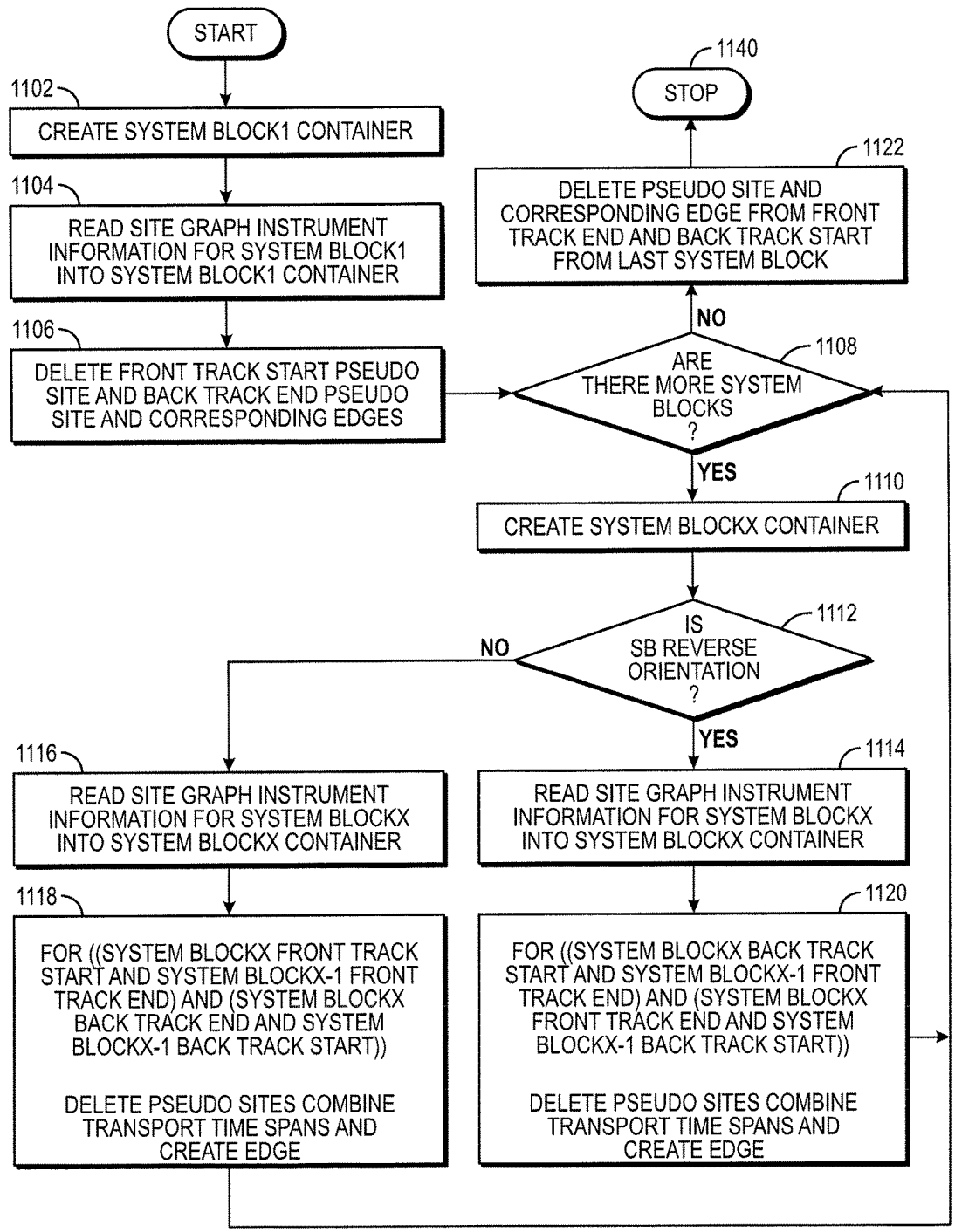
FIG. 11 shows a flowchart illustrating a stitching process according to an embodiment of the invention.

FIG. 11 shows a flowchart that provides more details regarding the stitching process according to embodiments of the invention.

The process starts by creating a first system block container (step 1102).

In step 1104, site graph instrument information for the first system block is provided to the first system block container.

In step 1106, front and back track pseudo nodes are deleted.

In step 1108, the processor determines if there are any more system blocks. If there are there are not, then pseudo nodes are deleted if they are still present (step 1122). If there are more system blocks, then an additional system block container X for a system block X is created (step 1110).

The processor then determines if the system block X is in a reverse orientation (step 1112). If it is, then the site graph instrument information for a reversed system block X is read into the system block X container (step 1114). As shown in step 1120, for each pair (i) of a back track start pseudo node in a system block X and a front track end pseudo node in a previous system block X-1, and for each pair (ii) of front track end pseudo node in the system block X and a back track start pseudo node in the previous system block X-1, the pair of pseudo nodes is deleted and the system blocks are joined. Joining the system blocks may include combining the transport time spans (e.g., combining the times associated with transporting a sample along two edges joined by stitching together two pseudo nodes) and creating an edge between the system blocks.

If it is not in reverse orientation, the site graph instrument information for system block X is read into the system block X container (step 1116). As shown in step 1118, for each pair (i) of a front track start pseudo node in a system block X and a front track end pseudo node in a system block X-1, and for each pair (ii) of a back track end pseudo node in the system block X and a back track start pseudo node in the system block X-1, the pair of pseudo nodes is deleted and the system blocks are joined. Joining the system blocks may include combining the transport time spans and creating an edge between the system blocks.

As shown in step 1108, this process can be repeated as often as desired with more system blocks.

Figure 12:
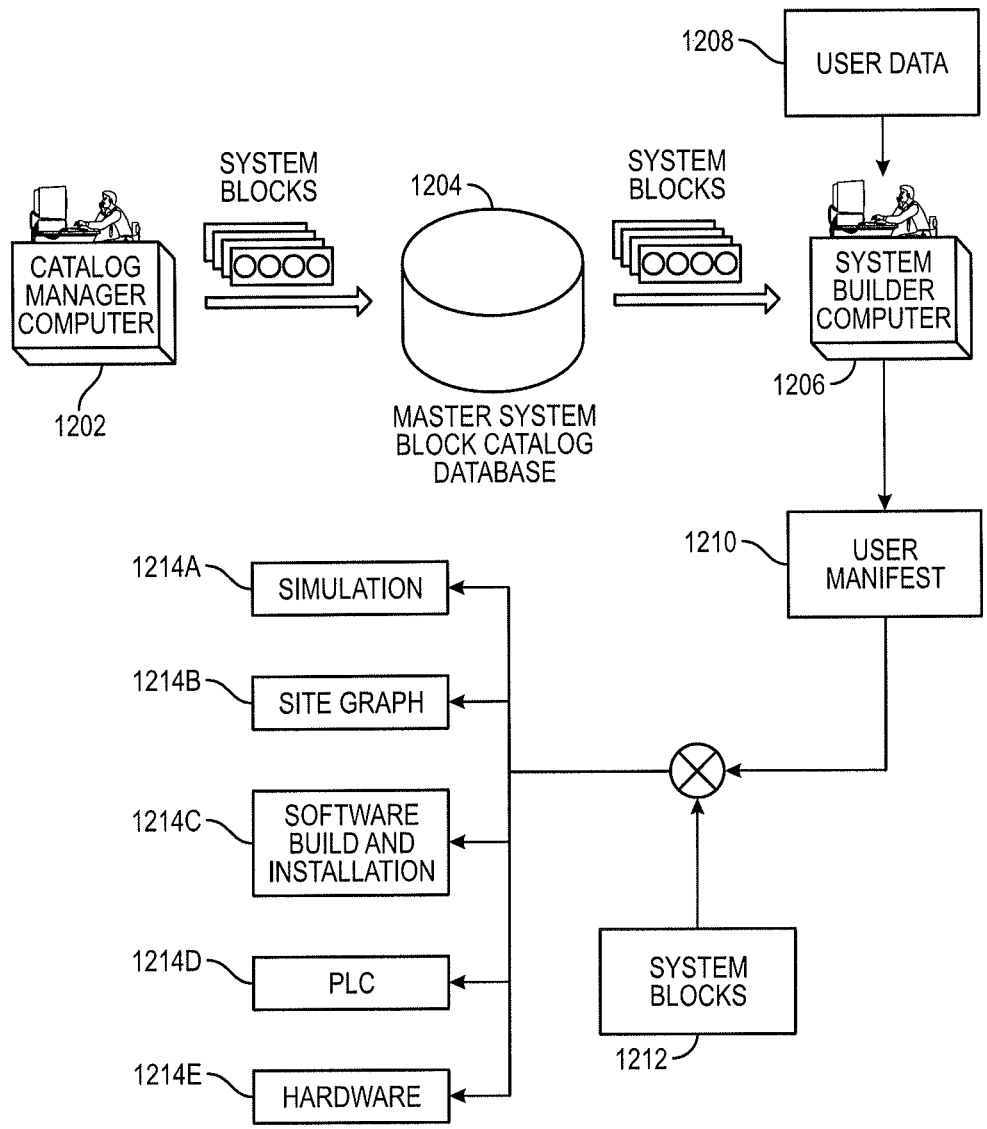
FIG. 12 shows a block diagram of a system according to an embodiment of the invention.

FIG. 12 shows a block diagram of a computer system according to an embodiment of the invention. FIG. 12 shows a catalog manager computer 1202 in communication with a master system block catalog database 1204. The catalog manager computer 1202 may be used to CREATE, UPDATE, or DELETE system blocks (and their corresponding subgraphs) and correctly place them in the catalog database 1204. The catalog database 1204 may contain all the confirmation information for every supported system block and instrument. The catalog database may index system blocks by part number.

The database 1204 may be a conventional, fault tolerant, relational, scalable, secure database such as Oracle™ or Sybase™. The database 1204 may be implemented using various standard data-structures, such as an array, hash, (linked) list, structured text file (e.g., XML), table, and/or the like. Such data-structures may be stored in memory and/or in (structured) files.

A system builder computer 1206 can also be in communication with the master system block catalog database 1204 and may retrieve system blocks from it to create various site graphs as described in this application. The system builder computer 1206 may comprise a processor and a computer readable medium coupled to the processor. The computer readable medium may comprise code, executable by the processor to implement a method comprising: receiving, by the processor, laboratory automation system design data for a laboratory automation system; and stitching, by the processor, and using the laboratory automation system design data, subgraphs associated with system blocks together to create a site network for the laboratory automation system, wherein each subgraph comprises a plurality of site nodes, edges, and pseudo nodes.

The catalog manager computer 1202, the database 1204, and the system builder computer 1206 may all be local or may be remote with respect to each other. Communication between these components can occur through any suitable wired or wireless network, and/or through any suitable private or public data network including the Internet.

In embodiments of the invention, a manifest file 1210 may be created for later use in the software installation process. The manifest may be used during software installation to generate system specific features. Such features may include a system site graph, parameterization for instruments for all layers of software, program code for lower level software functions, and system and instrument specific graphical user interface configuration and deployment code.

The manifest file 1210 can be used, together with the system block information 1212 in the system block data base to cause the system builder computer 1206 to perform a number of functions.

First, in 1214A, it can direct the system builder computer 1206 to simulate the system, even without having to use the hardware, which can be emulated. This simulation allows one to identify suboptimal behavior in the system (e.g., bottlenecks). Such identified suboptimal behavior can be fed back to the step of optimizing the system in the system builder, such that an iterative improvement of the overall system is facilitated.

Second, it can direct the system builder computer 1206 to create/stitch the site graph of the system (1214B), as described above.

Third, it can direct the system builder computer 1206 to build software to run the DCL, MCL and PCL (1214C). This software is created according to the requirements of a specific system. Hence this software is dedicated for each individual system and performs optimally on the respective system. This is unlike conventional systems in the field where only generic software having all functions (even if not all needed) is provided. The generated software according to the invention optimizes a created system to minimize memory and CPU consumption requirements, as well as system port and bus bandwidth requirements.

Fourth, it can direct the system builder computer to provide a configuration for a PLC (programmed logic controller) (1214D) without user intervention, which makes communication between the software and the hardware 1214E working more reliable. Providing a configuration for a PLC when the system is created or changed avoids having to manually (re-)wire the system and hence increases the reliability (as the probability of human error is reduced) and speed of setting up the system (wiring as a manual process is very time consuming) as well as the flexibility of the system, because changes can be made by software without having to introduce additional wires, relays and so on.

As mentioned above, embodiments of the invention can also be used to alter an existing configuration. In this case, the manifest file that corresponds to the altered system is compared to the manifest file of the system prior to the alteration, e.g., by a differential algorithm that identifies differences. The differences allow the system operator the quickly identify the necessary measures to implement the alteration. For example the result of comparing the two manifest files could be that system block 2 (being, e.g., a centrifuge) has to be replaced with a different system block (e.g., a centrifuge with greater throughput) or that the firmware of system block 1 has to be updated to enable new functionality.

When the system software has to be updated, the use of the manifest file provides better software version management than conventional processes. It also provides for easier software distribution, because the software needed to operate the system as well as all other configuration data is generated on each system using the manifest file.

For a software update, only a non-transitory computer readable medium comprising the most recent versions of libraries, the system block data base and linkable binaries is needed at the user's site. With this non-transitory computer readable medium, such as a CD/DVD, and the system's manifest file the software for the system, e.g. for the PCL, MCL and DCL layers, is built and deployed.

Further, embodiments of the invention can also work on line or in a stand-alone computer system. Embodiments of the invention may communicate with an external database to upload and download user configurations, provide for document and data sharing during the system creation process, and download updates for any system blocks.

Embodiments have a number of other features and benefits.

Embodiments of the invention can have layout and floor planning capabilities. The software can include true to scale 2D and 3D visualization capabilities. Images of walls and subassemblies can be displayed via a graphical user interface to the user so that the user can evaluate the spatial arrangement of instruments in the laboratory automation design system. In some embodiments, statistical data from customer or log files can be used as a base for the simulation, thereby allowing embodiments of the invention to produce an accurate representation of any proposed laboratory automation system. Because the proposed laboratory automation design system can be accurately simulated in 2D and/or 3D as well as operationally, the walking distances of lab personnel can also be simulated using embodiments of the invention. Estimates as to how many staff are needed to run the proposed laboratory automation design system may also be provided.

Embodiments of the invention can also provide for improved module redundancy planning Embodiments of the invention may highlight critical loaded modules and/or generate proposals for additional instruments and/or analyzers.

In the design phase, embodiments of the invention can also be used to generate a list of parts as well as generate price quotes for potential users of the system. a selected proposed laboratory automation design system.

Embodiments of the invention also have additional technical advantages. For example, embodiments of the invention can be used to create systems that are specifically tailored to the needs of a particular user. Such systems are efficiently designed to optimize not only speed and efficiency, but also hardware and software resources. Compared to conventional systems, hardware and software resources in embodiments of the invention are minimized, while achieving optimized processing capabilities.

Figure 13:
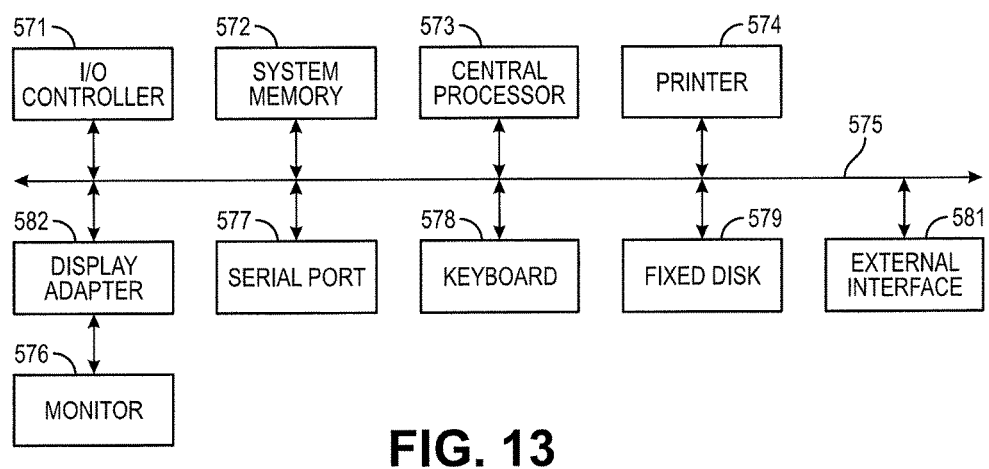
FIG. 13 shows a block diagram of a computer apparatus.

FIG. 13 is a block diagram of elements that may be present in a computing device or system configured to execute a method or operation in accordance with some embodiments of the invention. The subsystems shown in FIG. 13 may be used for the computers shown in FIG. 12, and are interconnected via a system bus 575. Additional subsystems such as a printer 574, a keyboard 578, a fixed disk 579, a monitor 576, which is coupled to a display adapter 582, and others are shown. Peripherals and input/output (I/O) devices, which couple to an I/O controller 571, can be connected to the computing system by any number of means known in the art, such as a serial port 577. For example, the serial port 577 or an external interface 581 can be used to connect the computing device to a wide area network such as the Internet, a mouse input device, or a scanner. The interconnection via the system bus 575 allows a programmed central processor 573 (e.g., a microprocessor, CPU, etc.) to communicate with each subsystem and to control the execution of instructions that may be stored in a system memory 572 or the fixed disk 579, as well as the exchange of information between subsystems. The system memory 572 and/or the fixed disk 579 may embody a computer-readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a processor, laboratory automation system design data for a laboratory automation system; and
   stitching, by the processor, and using the laboratory automation system design data, subgraphs associated with system blocks together to create a site network for the laboratory automation system, wherein each subgraph comprises a plurality of site nodes, edges and pseudo nodes, the pseudo nodes at borders of the subgraphs,
   wherein the subgraphs comprise a first subgraph and a second subgraph, and wherein stitching comprises identifying pseudo nodes in the first and second subgraphs and merging the identified pseudo nodes in the subgraphs; and
   wherein the method further comprises
   simulating, by the processor, operation of the site network for the laboratory automation system;
   rejecting, by the processor, the laboratory automation system if the operation of the laboratory automation system does not meet predetermined parameters;
   accepting, by the processor, the laboratory automation system if the operation of the laboratory automation system does meet predetermined parameters; and
   constructing the laboratory automation system.

2. The method of claim 1 wherein the system blocks comprise at least one of a centrifuge, an aliquoter, an input unit, an output unit, an analyzer, a storage unit, a decapper, and a recapper.

3. The method of claim 1 wherein the edges correspond to transport paths.

4. The method of claim 1 further comprising:
   generating by the processor, a manifest file comprising the laboratory automation system design data after receiving and before stitching.

5. The method of claim 1 wherein the laboratory automation system design data comprises data relating to a selection of the system blocks and the subgraphs, and an arrangement of the system blocks and the subgraphs relative to each other.

6. The method of claim 5 wherein the laboratory automation system design data comprises data relating to a predetermined throughput and turnaround time for samples being processed by the laboratory automation system.

7. The method of claim 6 wherein the laboratory automation system design data comprises data relating to a physical structure that will house the laboratory automation system.

8. The method of claim 1 further comprising:
   generating, by the processor, a parts list for the accepted laboratory automation system.

9. The method of claim 1, further comprising:
   displaying the site network and the system blocks on a graphical user interface.

10. The method of claim 1, further comprising:
    determining that the operation of the laboratory automation system does meet the predetermined parameters; and
    accepting the laboratory automation system.

11. The method of claim 1, wherein the predetermined parameters relate to expected sample throughput and/or turnaround time.

12. A computer apparatus comprising:
    one or more processors and a computer readable medium coupled to the one or more processors, the computer readable medium comprising code for causing the one or more processors to implement a method comprising:
    receiving laboratory automation system design data for a laboratory automation system; and
    stitching, and using the laboratory automation system design data, subgraphs associated with system blocks together to create a site network for the laboratory automation system, wherein each subgraph comprises a plurality of site nodes, edges and pseudo nodes, the pseudo nodes at borders of the subgraphs, and
    wherein the subgraphs comprise a first subgraph and a second subgraph, and wherein stitching comprises identifying pseudo nodes in the first and second subgraphs and merging the identified pseudo nodes in the subgraphs; and
    wherein the method further comprises
    simulating, by the processor, operation of the site network for the laboratory automation system;
    rejecting, by the processor, the laboratory automation system if the operation of the laboratory automation system does not meet predetermined parameters;
    accepting, by the processor, the laboratory automation system if the operation of the laboratory automation system does meet predetermined parameters; and
    constructing the laboratory automation system.

13. The computer apparatus of claim 12 wherein the system blocks comprise at least one of a centrifuge, an aliquoter, an input unit, an output unit, an analyzer, a storage unit, a decapper, and a recapper.

14. The computer apparatus of claim 12 wherein the edges correspond to transport paths.

15. The computer apparatus of claim 12 wherein the method further comprises:
   storing, by the one or more processors, in a database, a plurality of subgraphs associated with a plurality of system blocks.

16. The computer apparatus of claim 12 wherein the laboratory automation system design data comprises data relating to a selection of the system blocks and the subgraphs, and an arrangement of the system blocks and the subgraphs relative to each other.

17. The computer apparatus of claim 16 wherein the laboratory automation system design data comprises data relating to a predetermined throughput and turnaround time for samples being processed by the laboratory automation system.

18. The computer apparatus of claim 17, wherein the laboratory automation system design data comprises data relating to a physical structure that will house the laboratory automation system.

19. The computer apparatus of claim 12, wherein the method further comprises:
   generating, by the one or more processors, a parts list for the accepted laboratory automation system.

20. The computer apparatus of claim 12, further comprising a graphical user interface that displays the site network and the system blocks.

21. The computer apparatus of claim 12, wherein the method further comprises:
   determining that the operation of the laboratory automation system does meet the predetermined parameters; and
   accepting the laboratory automation system.

22. The computer apparatus of claim 12, wherein the predetermined parameters relate to expected sample throughput and/or turnaround time.

* * * * *